US006990561B2

(12) United States Patent
Yae et al.

(10) Patent No.: US 6,990,561 B2
(45) Date of Patent: Jan. 24, 2006

(54) DATA SHARING METHOD, TERMINAL, AND MEDIUM ON WHICH PROGRAM IS RECORDED

(75) Inventors: Mitsuo Yae, Funabashi (JP); Masayuki Nozawa, Matsudo (JP); Hideaki Kondo, Narashino (JP)

(73) Assignee: NTT Comware Corporation, Tokyo (JP)

( * ) Notice: Subject to any disclaimer, the term of this patent is extended or adjusted under 35 U.S.C. 154(b) by 492 days.

(21) Appl. No.: 10/181,678

(22) PCT Filed: Feb. 14, 2001

(86) PCT No.: PCT/JP01/01015

§ 371 (c)(1),
(2), (4) Date: Jul. 17, 2002

(87) PCT Pub. No.: WO01/90905

PCT Pub. Date: Nov. 29, 2001

(65) Prior Publication Data

US 2003/0118018 A1 Jun. 26, 2003

(30) Foreign Application Priority Data

May 23, 2000 (JP) .................................. 2000-151857

(51) Int. Cl.
*G06F 13/00* (2006.01)

(52) U.S. Cl. .................. 711/154; 711/151; 709/223
(58) Field of Classification Search ................ 711/100, 711/118, 141, 151, 154; 709/223, 224; 370/390
See application file for complete search history.

(56) References Cited

U.S. PATENT DOCUMENTS

| 5,535,373 A | * | 7/1996 | Olnowich .................... 703/25 |
| 5,592,625 A | * | 1/1997 | Sandberg .................... 711/147 |
| 5,778,437 A | * | 7/1998 | Baylor et al. ................ 711/141 |
| 5,781,757 A | * | 7/1998 | Deshpande .................. 711/146 |
| 5,881,313 A | * | 3/1999 | Ramakrishnan et al. ....... 710/40 |
| 6,038,644 A | * | 3/2000 | Irie et al. .................... 711/141 |
| 6,665,783 B2 | * | 12/2003 | Zahir ......................... 711/165 |
| 6,718,347 B1 | * | 4/2004 | Wilson ....................... 707/201 |

FOREIGN PATENT DOCUMENTS

| EP | 726663 | 8/1996 |
| JP | 05-089175 A1 | 10/1994 |
| JP | 6-282477 | 10/1994 |
| JP | 06-282477 A1 | 10/1994 |
| JP | 05-167456 A1 | 12/1994 |
| JP | 6-348662 | 12/1994 |
| JP | 06-348662 A1 | 12/1994 |
| JP | 08-214015 A1 | 8/1996 |
| JP | 10-173654 | 6/1998 |
| JP | 11-232233 A1 | 8/1999 |
| JP | 10-163109 A1 | 10/1999 |
| JP | 11-272534 A1 | 10/1999 |

* cited by examiner

*Primary Examiner*—Tuan V. Thai
(74) *Attorney, Agent, or Firm*—Darby & Darby

(57) ABSTRACT

In the case an update is generated for shared data housed in each terminal that composes a computer system, a terminal uniquely determined for every update based on a predetermined prescribed algorithm simultaneously transmits update information to the other terminals. In addition, information relating to member data within the group is also treated as shared data. Discrimination numbers are assigned to update information generated for shared data. During simultaneous multicast transmission, a discrimination number is transmitted together with update information, and that discrimination number is also managed as shared data in each terminal.

51 Claims, 12 Drawing Sheets

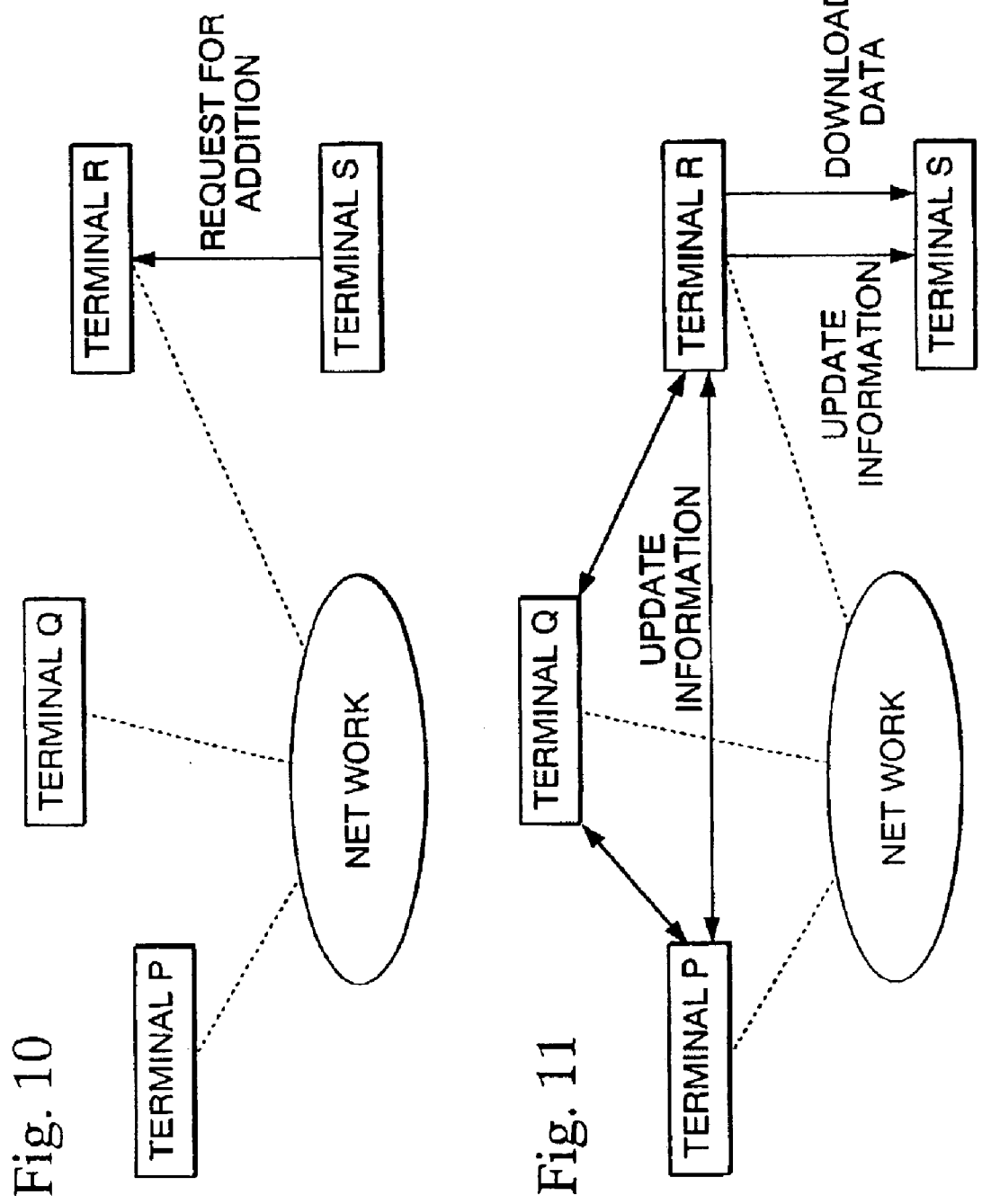

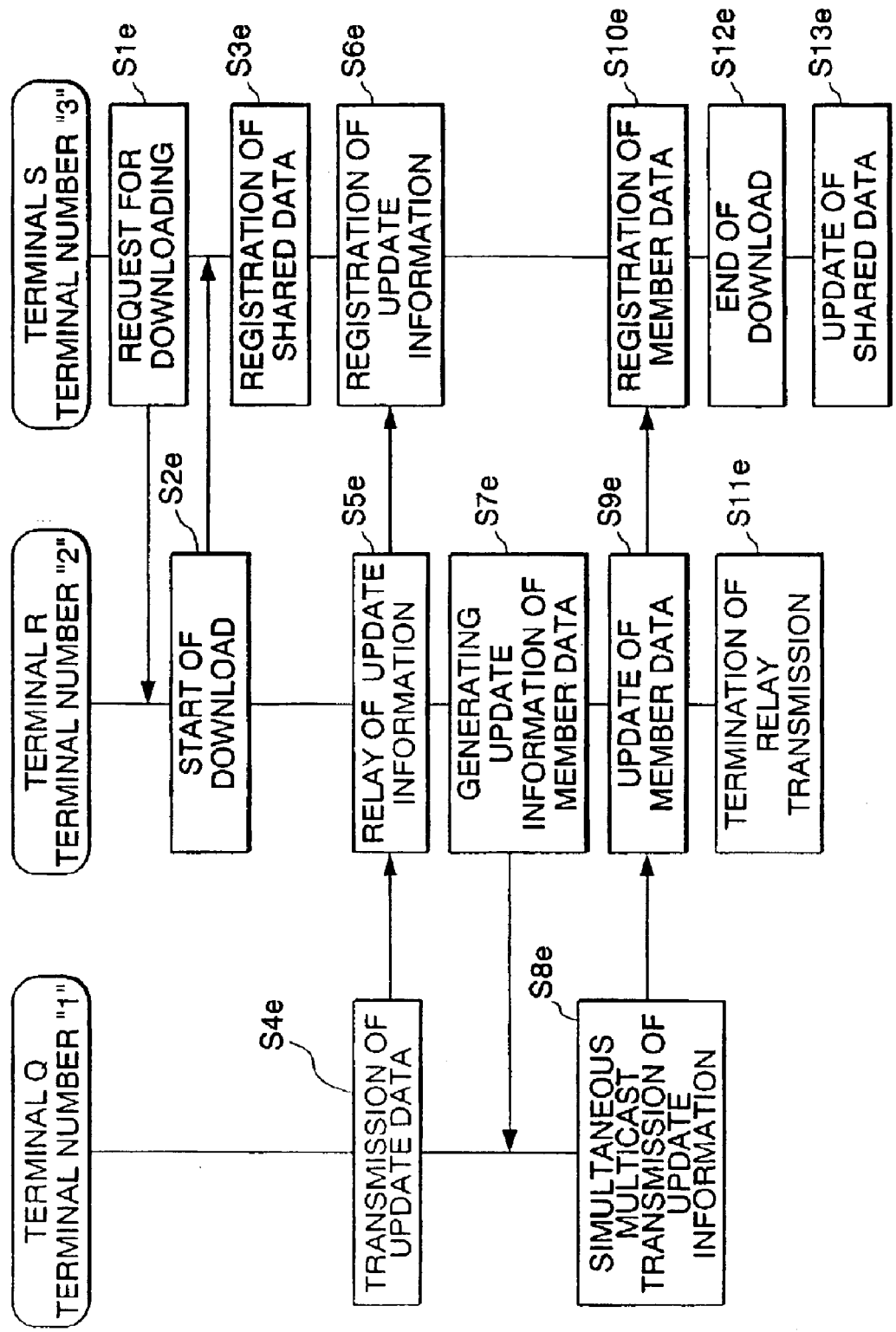

DATA SHARING METHOD, TERMINAL, AND MEDIUM ON WHICH PROGRAM IS RECORDED

BACKGROUND OF THE INVENTION

1. Field of the Invention

The present invention relates to a data sharing method, a terminal and a medium on which a program is recorded, and more particularly, to a technology for maintaining consistency of shared information housed in each terminal connected on a network.

2. Description of the Related Art

In a computer system composed of a group of a plurality of terminals interconnected via a network, there are cases in which the programs housed in each terminal as well as the data corresponding to said programs are used as shared data within the group. This shared data is used so as to be in the most recent state in all terminals within the group.

In such a computer system, a server device is installed within the group. This server device simultaneously transmits the most recent information of shared data generated in each terminal within the group to all terminals within the group. As a result, the consistency of shared data housed in each terminal belonging to the same group is maintained.

However, in this type of computer system, in the case of running, for example, a role playing game that can be simultaneously participated in by a large number of people, terminals within the group may be frequently interchanged as a result of a terminal participating in the game after the game has started or as a result of a terminal withdrawing from the game before it is finished. In such cases, when shared data housed in each terminal is attempted to be retained in the most recent state, the processing load on the server device becomes extremely high.

Thus, computer systems require a high-performance server device. For this reason, it is difficult to realize an economic computer system.

DISCLOSURE OF THE INVENTION

The present invention provides a data sharing method, terminal and medium on which a program is recorded that are capable of maintaining the consistency of shared data housed in each terminal while reducing the processing load in each terminal without using a high-performance server device in the O type of computer system described above.

According to one mode of the present invention, the present invention provides a data sharing method in which data is shared within a group composed of a plurality of terminals interconnected via a network, said method being provided with a simultaneous multicast transmission terminal determination step in which, in the case an update is generated for shared data that contains basic data shared within the group and member data relating to each terminal within the group, any one of the plurality of terminals is determined to be a simultaneous multicast transmission terminal that simultaneously transmits update information relating to updating to each terminal within the group according to a predetermined determination method, a transmission step in which update information is transmitted to the simultaneous multicast transmission terminal determined in the simultaneous multicast transmission terminal determination step from each terminal, a simultaneous multicast transmission step in which update information is simultaneously transmitted to the terminal corresponding to the member data by the simultaneous multicast transmission terminal, and an updating step in which shared data is updated according to the received update information in each terminal that has received the simultaneously transmitted update information.

Each terminal may be provided with a discrimination number storage step in which a discrimination number corresponding to update information is stored corresponding to shared data, the transmission step may transmit the discrimination number stored in the discrimination number storage step in addition to update information, and the simultaneous multicast transmission step may simultaneously transmit a discrimination number that is larger than the received discrimination number in the form of a new discrimination number in addition to update information.

The simultaneous multicast transmission terminal may be provided with a discrimination number judgment step in which the size of the discrimination number is judged by comparing the received discrimination number and the discrimination number stored in the above-mentioned discrimination number storage step, and the simultaneous multicast transmission step may simultaneously transmit the discrimination number in the case the received discrimination number has been judged to be equal to or greater than the discrimination number stored in the discrimination number storage step in the discrimination number judgment step.

Each terminal may also be provided with a mandatory simultaneous multicast transmission validity information storage step which houses mandatory simultaneous multicast transmission validity information that indicates whether or not update information is to be forcibly simultaneously transmitted, and the transmission step may transmit mandatory simultaneous multicast transmission validity information in addition to update information and discrimination number.

The simultaneous multicast transmission step may simultaneously transmit update information in the case mandatory simultaneous multicast transmission validity information indicates that update information is to be forcibly simultaneously transmitted.

Each terminal may also be provided with a reception step in which update information and a new discrimination number are received, and a discrimination number judgment step in which the size of the discrimination number is judged by comparing the new discrimination number with the discrimination number stored in the discrimination number storage step, and the updating step may update shared data according to received update information in the case the new discrimination number has been judged in the discrimination number judgment step to be larger than the discrimination number stored in the discrimination number storage step.

Each terminal may also be provided with a terminal number assignment step in which consecutive integers from "n to the total number of terminals in the group–1" (n is an integer) are assigned as terminal numbers to each terminal so as not to be duplicated, and the determination method may determine as the simultaneous multicast transmission terminal the terminal to which a terminal number is assigned that corresponds to the remainder after dividing the discrimination number stored in the discrimination number storage step by the number of terminals corresponding to the member data.

Member data may contain the performance value of each terminal, and the determination method may determine the above-mentioned simultaneous multicast transmission terminal based on the performance value.

Each terminal may also be provided with a terminal number assignment step in which consecutive integers from n to "n+the number of terminals within the group that exceed a prescribed reference value−1" (n is an integer) are assigned as terminal numbers only to those terminals for which the performance value contained in member data exceeds the prescribed reference value so as not to be duplicated, and the determination method may determine as the simultaneous multicast transmission terminal the terminal to which a terminal number is assigned that corresponds to the remainder after dividing the discrimination number stored in the discrimination number storage step by the number of terminals corresponding to the member data that exceed the reference value.

The simultaneous multicast transmission terminal may be provided with a next simultaneous multicast transmission terminal determination step that determines the next simultaneous multicast transmission terminal that simultaneously transmits the next update information, a starting notification transmission step that transmits simultaneous multicast transmission starting notification which indicates that simultaneous multicast transmission has started in addition to update information to the next simultaneous multicast transmission terminal determined in the next simultaneous multicast transmission terminal determination step, and an ending notification transmission step that transmits a simultaneous multicast transmission ending notification which indicates that simultaneous multicast transmission has ended to the next simultaneous multicast transmission terminal, while the next simultaneous multicast transmission terminal may be provided with a notification reception step that receives update information, simultaneous multicast transmission starting notification and simultaneous multicast transmission ending notification, and a proxy simultaneous multicast transmission step in which, in the case a simultaneous multicast transmission ending notification has not yet been received when a prescribed amount of time has elapsed after receiving a simultaneous multicast transmission starting notification in the notification reception step, update information is simultaneously transmitted to the terminal corresponding to member data.

The next simultaneous multicast transmission terminal may also be provided with an update information reception step in which update information transmitted from each terminal is received, and a proxy simultaneous multicast transmission step in which, in the case update information is update information that is to be transmitted to the simultaneous multicast transmission terminal, said update information is simultaneously transmitted to the terminal corresponding to member data.

Each terminal may also be provided with a response judgment step in which a judgment is made as to whether or not there is a response from the simultaneous multicast transmission terminal that has transmitted update information, and a next simultaneous multicast transmission terminal determination step in which that next simultaneous multicast transmission terminal is determined that simultaneously transmits the next update information, and the transmission step may transmit update information to the next simultaneous multicast transmission terminal determined in the next simultaneous multicast transmission terminal determination step in the case there is judged to be no response in the response judgment step.

The next simultaneous multicast transmission terminal may also be provided with a proxy simultaneous multicast transmission step in which update information is simultaneously transmitted to the terminal corresponding to member data.

Each terminal may also be provided with a malfunction judgment step in which a judgment is made as to whether or not there is a malfunction in another terminal belonging to the group, and a next simultaneous multicast transmission terminal determination step in which the next simultaneous multicast transmission terminal is determined that simultaneously transmits the next update information, and the transmission step may transmit update information, in which member data relating to a terminal corresponding to another communication terminal has been deleted from shared data, to the next simultaneous multicast transmission terminal determined in the next simultaneous multicast transmission terminal determination step in the case it has been judged that there is a malfunction in another terminal in the malfunction judgment step.

Terminals newly added to the group may be provided with a download request step in which downloading of the above-mentioned shared data is requested to any terminal belonging to the group, terminals newly added to the group may be provided with a shared data reception step in which shared data is received from the terminal to which downloading was requested in the download request step, terminals newly added to the group may be provided with an update information reception step in which update information simultaneously transmitted within the group is received from the terminal to which downloading was requested, and an update information updating step in which shared data is updated according to received update information following completion of downloading, and the terminal to which downloading has been requested maybe provided with a shared data transmission step in which shared data is transmitted to the newly added terminal, and an update information relay step in which update information received by simultaneous multicast transmission is transmitted to the newly added terminal.

Member data may contain the performance values of each terminal, and a terminal to which downloading has been requested maybe provided with a request notification step in which a request to execute downloading is made to a terminal in which the performance value exceeds a predetermined reference value, while the terminal requested to execute downloading may execute downloading to a newly added terminal.

The update information relay step may transmit update information to a newly added terminal that was generated during the time from update data generated immediately after the start of downloading to a newly added terminal to the generation of update data relating to member data in which the newly added terminal was added.

According to another mode of the present invention, the present invention provides a terminal belonging to a group composed of a plurality of terminals interconnected via a network, said terminal being provided with a shared data storage means that stores shared data containing basic data shared within the group and member data relating to each terminal within the group, a simultaneous multicast transmission terminal determination means which, in the case an update is generated for shared data, determines any one of the plurality of terminals to be a simultaneous multicast transmission terminal that simultaneously transmits update information relating to updating to each terminal within the group according to a predetermined determination method, a transmission means that transmits information to the simultaneous multicast transmission terminal determined by the simultaneous multicast transmission terminal determination means, a simultaneous multicast transmission means that simultaneously transmits update information to the terminal corresponding to the above-mentioned member data, and an updating means that updates shared data according to received update information in each terminal that receives the simultaneously transmitted update information.

A discrimination number storage means may be provided that stores a discrimination number corresponding to update information corresponding to shared data, the transmission means may transmit the discrimination number stored by the discrimination number storage means in addition to update information, and the simultaneous multicast transmission means may simultaneously transmit a discrimination number that is larger than the received discrimination number in the form of a new discrimination number in addition to update information.

The simultaneous multicast transmission terminal may be provided with a discrimination number judgment means that judges the size of the discrimination number by comparing the received discrimination number and the discrimination number stored by the discrimination number storage means, and the simultaneous multicast transmission means may simultaneously transmit the discrimination number in the case the received discrimination number has been judged to be equal to or greater than the discrimination number stored by the discrimination number storage means by the discrimination number judgment means.

A mandatory simultaneous multicast transmission validity information storage means may be provided that houses mandatory simultaneous multicast transmission validity information which indicates whether or not update information is to be forcibly simultaneously transmitted, and the transmission means may transmit mandatory simultaneous multicast transmission validity information in addition to update information and discrimination number.

The simultaneous multicast transmission means may simultaneously transmit update information in the case mandatory simultaneous multicast transmission validity information indicates that update information is to be forcibly simultaneously transmitted.

A reception means that receives update information and a new discrimination number, and a discrimination number judgment means that judges the size of the discrimination number by comparing the new discrimination number with the discrimination number stored by the discrimination number storage means may be provided, and the updating means may update shared data according to received update information in the case the new discrimination number has been judged by the discrimination number judgment means to be larger than the discrimination number stored by the discrimination number storage means.

A terminal number assignment means may be provided that assigns consecutive integers from n to "the total number of terminals in the group-1" (n is an integer) as terminal numbers to each terminal so as not to be duplicated, and the determination method may determine as the simultaneous multicast transmission terminal the terminal to which a terminal number is assigned that corresponds to the remainder after dividing the discrimination number stored by the discrimination number storage means by the number of terminals corresponding to the member data.

Member data may contain the performance value of each terminal, and the determination method may determine the above-mentioned simultaneous multicast transmission terminal based on the performance value.

A terminal number assignment means may be provided that assigns consecutive integers from n to "n+the number of terminals within the group that exceed a prescribed reference value-1" (n is an integer) as terminal numbers only to those terminals for which the performance value contained in member data exceeds the prescribed reference value so as not to be duplicated, and the determination method may determine as the simultaneous multicast transmission terminal the terminal to which a terminal number is assigned that corresponds to the remainder after dividing the discrimination number stored by the discrimination number storage means by the number of terminals corresponding to the member data that exceed the reference value.

The simultaneous multicast transmission terminal may be provided with a next simultaneous multicast transmission terminal determination means which determines the next simultaneous multicast transmission terminal that simultaneously transmits the next update information, a starting notification transmission means that transmits a simultaneous multicast transmission starting notification which indicates that simultaneous multicast transmission has started in addition to update information to the next simultaneous multicast transmission terminal determined by the next simultaneous multicast transmission terminal determination means, and an ending notification transmission means that transmits a simultaneous multicast transmission ending notification which indicates that simultaneous multicast transmission has ended to the next simultaneous multicast transmission terminal, while the next simultaneous multicast transmission terminal may be provided with a notification reception means that receives update information, simultaneous multicast transmission starting notification and simultaneous multicast transmission ending notification, and a proxy simultaneous multicast transmission means which, in the case a simultaneous multicast transmission ending notification has not yet been received when a prescribed amount of time has elapsed after receiving a simultaneous multicast transmission starting notification by the notification reception means, simultaneously transmits update information to the terminal corresponding to member data.

The next simultaneous multicast transmission terminal may also be provided with an update information reception means that receives update information transmitted from each terminal, and a proxy simultaneous multicast transmission means which, in the case update information is update information that is to be transmitted to the simultaneous multicast transmission terminal, simultaneously transmits said update information to the terminal corresponding to member data.

A response judgment means, which judges whether or not there is a response from the simultaneous multicast transmission terminal that has transmitted update information, and a next simultaneous multicast transmission terminal determination means, which determines the next simultaneous multicast transmission terminal that simultaneously transmits the next update information, may be provided, and the transmission means may transmit update information to the next simultaneous multicast transmission terminal determined by the next simultaneous multicast transmission terminal determination means in the case there is judged to be no response by the response judgment means.

The next simultaneous multicast transmission terminal may also be provided with a proxy simultaneous multicast transmission means which simultaneously transmits update information to the terminal corresponding to member data.

A malfunction judgment means, which judges whether or not there is a malfunction in another terminal belonging to the group, and a next simultaneous multicast transmission terminal determination means, which determines the next simultaneous multicast transmission terminal that simultaneously transmits the next update information, may also be provided, and the transmission means may transmit update information, in which member data relating to a terminal corresponding to another communication terminal has been deleted from shared data, to the next simultaneous multicast transmission terminal determined by the next simultaneous multicast transmission terminal determination means in the case it has been judged that there is a malfunction in another terminal by the malfunction judgment means.

In the case of being newly added to the group, a download request means, which requests downloading of shared data to any terminal belonging to the group, a shared data reception means, which receives shared data from the terminal to which downloading was requested by the download request means, an update information reception means, which receives update information simultaneously transmitted within the group from the terminal to which downloading was requested, and an update information updating means, which updates shared data according to received update information following completion of downloading, may be provided, and the terminal to which downloading has been requested may be provided with a shared data transmission means, which transmits shared data to the newly added terminal, and an update information relay means, which transmits update information received by simultaneous multicast transmission to the newly added terminal.

Member data may contain the performance values of each terminal, and a terminal to which downloading has been requested may be provided with a request notification means, which requests execution of downloading to a terminal in which the performance value exceeds a predetermined reference value, while the terminal requested to execute downloading may execute downloading to a newly added terminal.

The update information relay means may transmit update information to a newly added terminal that was generated during the time from update data generated immediately after the start of downloading to a newly added terminal to the generation of update data relating to member data in which the newly added terminal was added.

According to another mode of the present invention, the present invention provides a medium on which is recorded a program for sharing data within a group composed of a plurality of terminals interconnected via a network, and in the case updating occurs for shared data containing basic data shared within the group and member data relating to each terminal within the group, any one of the plurality of terminals is determined to be a simultaneous multicast transmission terminal that simultaneously transmits update information relating to updating to each terminal within the group according to a predetermined determination method, and together with transmitting update information to said determined simultaneous multicast transmission terminal, the simultaneous multicast transmission terminal simultaneously transmits update information to the terminal corresponding to the above member data, and each terminal that has received simultaneously transmitted update information updates shared data according to said received update information.

Each terminal may store a discrimination number corresponding to update information corresponding to shared data, transmit the above stored discrimination number to the determined simultaneous multicast transmission terminal in addition to update information, and the simultaneous multicast transmission terminal may simultaneously transmit a discrimination number that is larger than the received discrimination number in the form of a new discrimination number in addition to update information.

The simultaneous multicast transmission terminal may judge the size of the discrimination number by comparing the received discrimination number and the stored discrimination number, and may simultaneously transmit the discrimination number in the case the received discrimination number has been judged to be equal to or greater than the stored discrimination number in said judgment.

Each terminal may house mandatory simultaneous multicast transmission validity information which indicates whether or not update information is to be forcibly simultaneously transmitted, and may transmit mandatory simultaneous multicast transmission validity information in addition to update information and discrimination number to the determined simultaneous multicast transmission terminal.

The simultaneous multicast transmission terminal may simultaneously transmit update information in the case received mandatory simultaneous multicast transmission validity information indicates that update information is to be forcibly simultaneously transmitted.

Each terminal may receive update information and a new discrimination number, may judge the size of the discrimination number by comparing the new discrimination number with the stored discrimination number, and when simultaneously transmitted update information is received, may update shared data according to received update information in the case the new discrimination number has been judged to be larger than the stored discrimination number in said judgment.

Each terminal may assign consecutive integers from n to "the total number of terminals in the group-138 (n is an integer) as terminal numbers to each terminal so as not to be duplicated, and the determination method may determine as the simultaneous multicast transmission terminal the terminal to which a terminal number is assigned that corresponds to the remainder after dividing the stored discrimination number by the number of terminals corresponding to the member data.

Member data may contain the performance value of each terminal, and the determination method may determine the simultaneous multicast transmission terminal based on the performance value.

Each terminal may assign consecutive integers from n to "n+the number of terminals within the group that exceed a prescribed reference value-138 (n is an integer) as terminal numbers only to those terminals for which the performance value contained in member data exceeds the prescribed reference value so as not to be duplicated, and the determination method may determine as the simultaneous multicast transmission terminal the terminal to which a terminal number is assigned that corresponds to the remainder after dividing the stored discrimination number by the number of terminals corresponding to the member data that exceed the reference value.

The simultaneous multicast transmission terminal may determine the next simultaneous multicast transmission terminal that simultaneously transmits the next update information, and together with transmitting a simultaneous multicast transmission starting notification which indicates that simultaneous multicast transmission has started in addition to update information to said determined next simultaneous multicast transmission terminal, and a simultaneous multicast transmission ending notification which indicates that simultaneous multicast transmission has ended to the next simultaneous multicast transmission terminal, the next simultaneous multicast transmission terminal may receive update information, simultaneous multicast transmission starting notification and simultaneous multicast transmission ending notification, and in the case a simultaneous multicast transmission ending notification has not yet been received when a prescribed amount of time has elapsed after receiving a simultaneous multicast transmission starting notification, may simultaneously transmit update information to the terminal corresponding to member data.

The next simultaneous multicast transmission terminal may also receive update information transmitted from each terminal, and in the case update information is update information that is to be transmitted to the simultaneous multicast transmission terminal, may simultaneously transmit update information to the terminal corresponding to member data.

Each terminal may also judge whether or not there is a response from the simultaneous multicast transmission terminal that has transmitted update information, determine the next simultaneous multicast transmission terminal that simultaneously transmits the next update information, and transmit update information to the determined next simultaneous multicast transmission terminal in the case there is judged to be no response in said judgment.

The next simultaneous multicast transmission terminal may also simultaneously transmit update information to the terminal corresponding to member data.

Each terminal may also judge whether or not there is a malfunction in another terminal belonging to the group, determine the next simultaneous multicast transmission terminal that simultaneously transmits the next update information, and transmit update information, in which member data relating to a terminal corresponding to another communication terminal has been deleted from shared data, to the determined next simultaneous multicast transmission terminal in the case it has been judged that there is a malfunction in another terminal in said judgment.

A terminal that is newly added to the group may request downloading of shared data to any terminal belonging to the group, a terminal newly added to the group may receive shared data from the terminal to which downloading has been requested, a terminal newly added to the group may receive update information simultaneously transmitted within the group from the terminal to which downloading was requested, and together with updating the shared data according to the received update information, the terminal to which downloading was requested may transmit shared data to the newly added terminal, and transmit update information received by simultaneous multicast transmission to the newly added terminal.

Member data may contain the performance values of each terminal, and a terminal to which downloading has been requested may request execution of downloading to a terminal in which the performance value exceeds a predetermined reference value, while the terminal requested to execute downloading may execute downloading to a newly added terminal.

When update information received by simultaneous multicast transmission is transmitted to a terminal that has been newly added, update information may be transmitted to the newly added terminal that was generated during the time from update data generated immediately after the start of downloading to a newly added terminal to the generation of update data relating to member data in which the newly added terminal was added.

BRIEF DESCRIPTION OF THE DRAWINGS

FIG. 10 is a drawing showing the general operation in the case of adding a terminal in the above embodiment.

FIG. 11 is a drawing showing the general operation in the case of adding a terminal in the above embodiment.

FIG. 12 is a sequence drawing showing the detailed operation in the case of adding a terminal in the above embodiment.

BEST MODE FOR CARRYING OUT THE INVENTION

[1] Configuration of the Embodiment

[1.1] General Configuration of a Computer System

Figure 1:
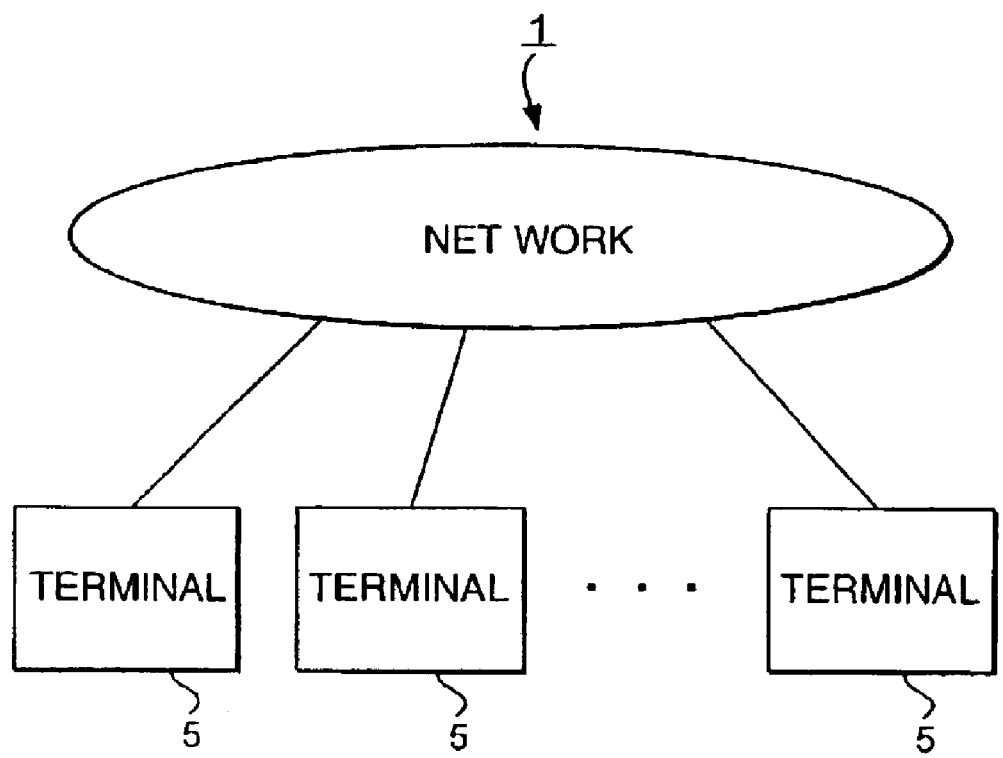
FIG. 1 is a drawing showing the general configuration of a computer system in an embodiment of the present invention.

FIG. 1 is a drawing showing the general configuration of computer system 1 that is an embodiment of the present invention.

Computer system 1 shown in FIG. 1 is a computer system that executes, for example, a role playing game that can be simultaneously participated in by a large number of persons.

This computer system 1 is equipped with a plurality of terminals 5 that can be interconnected via a network. This plurality of terminals 5 house data relating to each terminal 5 belonging to the same group, as well as information relating to the virtual locations and attributes in the game of each terminal participating in the game, in the form of shared data shared among each terminal in the group.

Moreover, these terminals 5 transmit update information generated by updating the shared data to a single terminal that is sequentially determined for each update information based on a prescribed algorithm (to be referred to as a simultaneous multicast transmission terminal). The simultaneous multicast transmission terminal that has received update information simultaneously transmits said update information to all other terminals 5 belonging to the same group. Each terminal 5 belonging to the same group then reflects the update information received from the simultaneous multicast transmission terminal in the shared data. As a result, the consistency of shared data housed in each terminal 5 belonging to the same group is maintained.

Next, the following provides a detailed explanation of the terminals 5 that compose computer system 1.

[1.2] Terminal Configuration

[1.2.1] General Confirmation of Terminals

Figure 2:
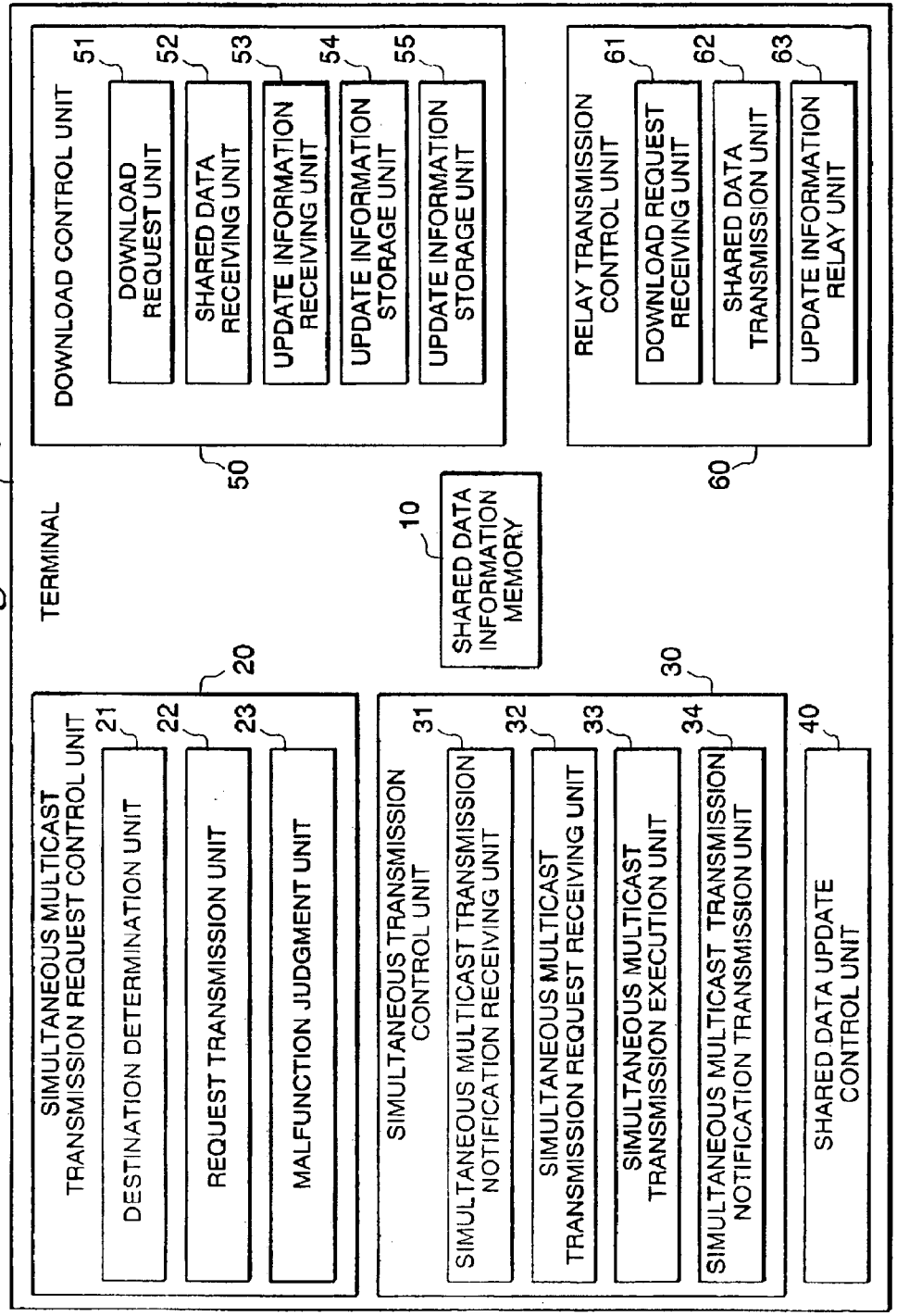
FIG. 2 is a block drawing showing the general configuration of the terminal shown in FIG. 1.

An explanation of the general configuration of terminals 5 is explained with reference to FIG. 2. As shown in FIG. 2, each terminal 5 is equipped with components that can be broadly classified into shared data storage unit 10, simultaneous multicast transmission request control unit 20, simultaneous multicast transmission controller 30, shared data update control unit 40, download control unit 50 and relay transmission control unit 60.

[1.2.1.1] General Configuration of Shared Data Storage Unit 10

Figure 3:
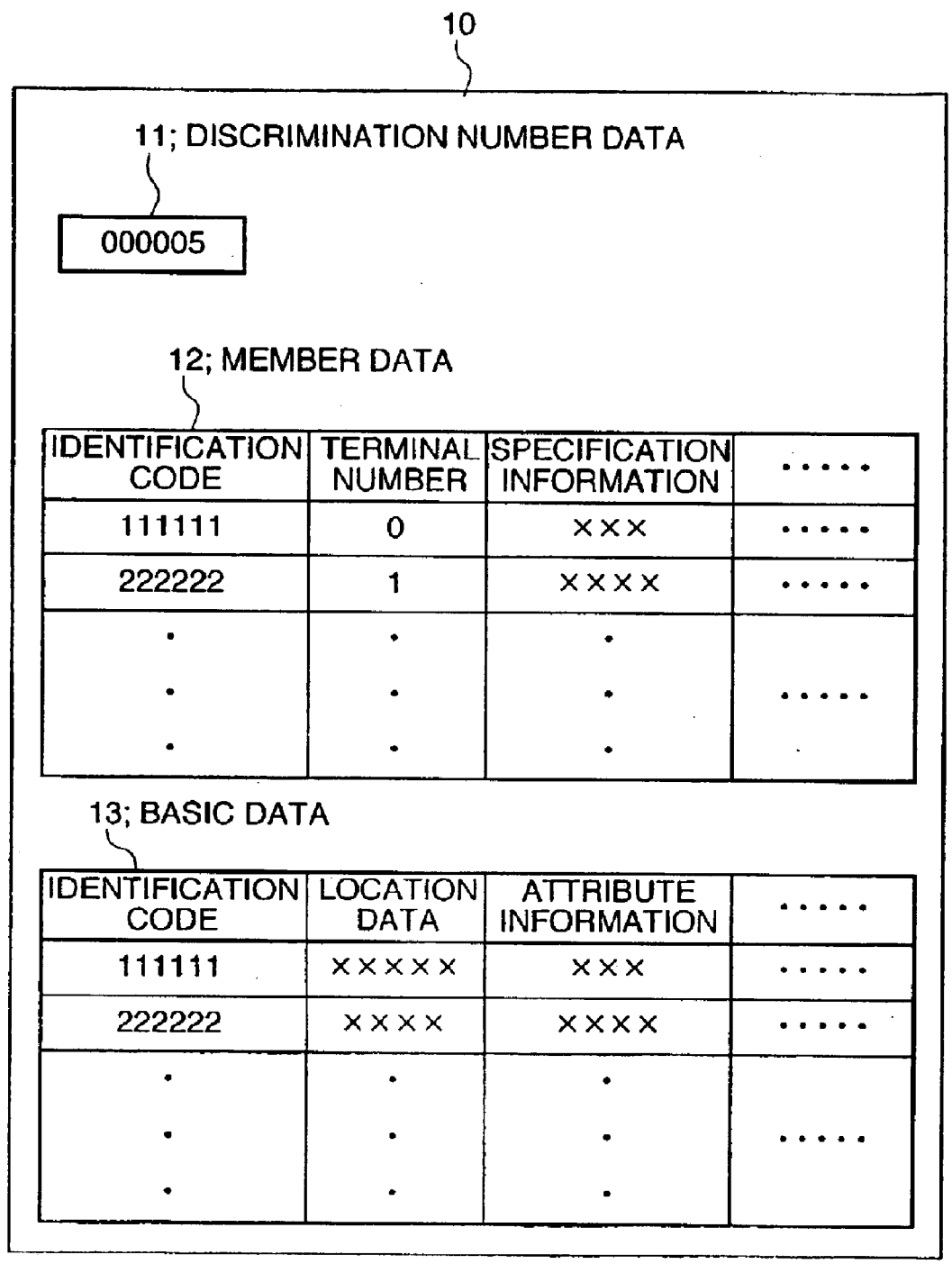
FIG. 3 is a drawing showing the configuration of the shared data storage unit shown in FIG. 2.

Next, an explanation is provided of the general configuration of share data storage unit 10 with reference to FIG. 3. Shared data storage unit 10 is rewritable memory that houses shared data shared among each terminal within the group. Shared data includes discrimination number data 11, member data 12 and basic data 13.

Here, discrimination number data 11 is data that indicates the discrimination number assigned for each simultaneous multicast transmission of update information. Discrimination number data 11 indicates a discrimination number that is transmitted according to an upcoming simultaneous multicast transmission.

Member data 12 is data that indicates information relating to each terminal 5 belonging to the same group, examples of which include a terminal identification code, a terminal number for determining the simultaneous multicast transmission terminal (to be referred to as the terminal number) and terminal specifications information. This terminal number is a numeric value that indicates, for example, either "0", "1" or "2" in the case three terminals belong to the group. This numeric value is assigned to each terminal so that they are not duplicated. This numerical value is also used when determining the simultaneous multicast transmission terminal.

Here, an explanation of the method of updating the terminal number. In the case the number of terminals 5 in the group is increased or decreased, another terminal in the group that has detected the increase or decrease transmits to the effect that the number of terminals in the group has increased or decreased to the terminal corresponding to, for example, the first registered terminal identification code among the terminal identification codes of member data 12. The terminal that has received that message generates update information of member data that contains the terminal numbers. This terminal then transmits the generated update information to the simultaneous multicast transmission terminal. The simultaneous multicast transmission terminal then simultaneously transmits the received update information to all terminals belonging to the group. Each terminal then updates the terminal numbers contained in member data by reflecting the received update information in existing member data.

Terminal specifications information is information that indicates, for example, hard disk and memory capacity, CPU performance and the communication speed of the network to which the terminals are connected.

Here, an explanation is provided of the method for updating specifications information. A terminal 5 in the group periodically transmits specifications information to, for example, the terminal corresponding to the first registered terminal identification code among the terminal identification codes of member data 12. The terminal that has received the specifications information generates update information of member data that contains specification information. This terminal then transmits this generated update information to the simultaneous multicast transmission terminal. The simultaneous multicast transmission terminal then simultaneously transmits the received update information to all terminals belonging to the group by multicast transmission. Each terminal updates specifications information contained in member data by reflecting the received update information in existing member data.

Next, basic data 13 is data that indicates information relating to virtual locations and attributes in the game of terminals 5 corresponding to each terminal identification code of member data 12.

[1.2.1.2] Detailed Configuration of Simultaneous Multicast Transmission

Request Control Unit

Next, an explanation is provided of the detailed configuration of simultaneous multicast transmission request control unit 20 with reference to FIG. 2. Simultaneous multicast transmission request control unit 20 performs control when a request to simultaneous transmit update information is made to the simultaneous multicast transmission terminal. As shown in FIG. 2, simultaneous multicast transmission request control unit 20 is composed of transmission destination determination unit 21, simultaneous multicast transmission request transmission unit 22 and malfunction judgment unit 23.

Here, transmission destination determination unit 21 determines the simultaneous multicast transmission terminal that simultaneously transmits update information relating to an update to all terminals belonging to the same group based on a prescribed algorithm in the case said update has been generated for shared data. Furthermore, this algorithm determines a single terminal from among the terminals belonging to the same group as the simultaneous multicast transmission terminal, and this algorithm should be able to determine the simultaneous multicast transmission terminal in order so that the difference in the processing burden of each terminal within the group does not become excessively large. For example, this algorithm pre-assigns consecutive integers from "0" to "the total number of terminals in the group−1" (n is an integer) as terminal numbers to each terminal so as not to be duplicated. The terminal 5, to which a terminal number is assigned that corresponds to the numeric value calculated according to the calculation formula represented with [Formula 1] described below, is then determined to be the simultaneous multicast transmission terminal.

$$\text{"Discrimination number" mod "Total number of terminal devices in group"} \quad \text{[Formula 1]}$$

Here, mod is the result of calculating the remainder when dividing A by B in the case of, for example, "A" mod "B".

For the discrimination number, "1" is added to the existing discrimination number each time update information is simultaneously transmitted. Thus, the numeric value calculated from [Formula 1] changes by "1" at a time in order from "0" to "the total number of terminals in the group−1". As a result, each terminal 5 in the group becomes the simultaneous multicast transmission terminal in order each time update information is simultaneously transmitted.

Simultaneous multicast transmission request transmission unit 22 transmits update information to which a discrimination number has been given at the present time, mandatory simultaneous multicast transmission validity information, and a simultaneous multicast transmission request signal that requests simultaneous multicast transmission, to the simultaneous multicast transmission terminal determined by transmission destination determination unit 21. Here, mandatory simultaneous multicast transmission validity information is information that indicates whether or not simultaneous multicast transmission is to be performed forcibly in the case the discrimination number given to update information received by the simultaneous multicast transmission terminal is smaller than the discrimination number housed in the simultaneous multicast transmission terminal.

Malfunction judgment unit 23 judges that there is a malfunction in the simultaneous multicast transmission terminal in the case simultaneous multicast transmission has not been performed within the predetermined amount of time from the simultaneous multicast transmission terminal to which a simultaneous multicast transmission request signal has been sent by simultaneous multicast transmission request transmission unit 22. Malfunction judgment unit 23 notifies transmission destination determination unit 21 with a message to the effect that the simultaneous multicast transmission terminal has malfunctioned. In this case, transmission destination determination unit 21 adds "1" to the current discrimination number. Transmission destination determination unit 21 then determines as the simultaneous multicast transmission terminal the terminal to which the terminal number corresponding to the numeric value calculated according to the above [Formula 1] is assigned.

[1.2.1.3] Detailed Configuration of Simultaneous Multicast Transmission Controller Next, an explanation is provided of the detailed configuration of simultaneous multicast transmission controller 30 with reference to FIG. 2. Simultaneous multicast transmission controller 30 performs control during simultaneous multicast transmission of update information to all terminals belonging to the same group. As shown in FIG. 2, simultaneous multicast transmission controller 30 is equipped with simultaneous multicast transmission notification receiving unit 31, simultaneous multicast transmission request receiving unit 32, simultaneous multicast transmission execution unit 33 and simultaneous multicast transmission notification transmission unit 34.

Here, simultaneous multicast transmission notification receiving unit 31 receives a notification indicating the start or end of simultaneous multicast transmission that has been transmitted by the simultaneous multicast transmission terminal to the terminal to serve as the simultaneous multicast transmission notification terminal during the next simultaneous multicast transmission.

Simultaneous multicast transmission request receiving unit 32 receives a simultaneous multicast transmission request signal transmitted from another terminal belonging to the same group.

Simultaneous multicast transmission execution unit 33 adds "1" to discrimination number given to the update information in the case a simultaneous multicast transmission request signal has been received by simultaneous multicast transmission request receiving unit 32. Simultaneous multicast transmission execution unit 33 then simultaneously transmits update information to other terminals belonging to the same group. In this case, simultaneous multicast transmission execution unit 33 performs simultaneous multicast transmission after confirming that a notification indicating completion of simultaneous multicast transmission transmitted from the previous simultaneous multicast transmission terminal has been received by simultaneous multicast transmission notification receiving unit 31.

Simultaneous multicast transmission execution unit 33 does not perform simultaneous multicast transmission as a general rule in the case the discrimination number received with the simultaneous multicast transmission request signal is smaller than the discrimination number stored in shared data storage unit 10. However, simultaneous multicast transmission execution unit 33 does perform simultaneous multicast transmission in the case mandatory simultaneous multicast transmission validity information received with the simultaneous multicast transmission request signal indicates mandatory simultaneous multicast transmission.

Simultaneous multicast transmission notification transmission unit 34 respectively transmits a notification indicating the start or end of simultaneous multicast transmission to the terminal to serve as the simultaneous multicast transmission notification terminal during simultaneous multicast transmission to all terminals 5 within the same group and during the next simultaneous multicast transmission performed.

[1.2.1.4] Detailed Configuration of Shared Data Update Control Unit

Next, shared data update control unit 40 controls update processing, including registration, alteration and deletion, performed for shared data housed in shared data storage unit 10.

Shared data update control unit 40 updates shared data using simultaneously transmitted update information in the case the discrimination number contained in the simultaneously transmitted update information is larger than the discrimination number stored in shared data storage unit 10.

[1.2.1.5] Detailed Configuration of Download Control Unit

Next, an explanation is provided of the detailed configuration of download control unit 50 with reference to FIG. 2. Download control unit 50 performs control during downloading of shared data from another terminal belonging to the same group in the case a terminal participates in the game after the game has started.

As shown in FIG. 2, download control unit 50 is equipped with download request unit 51, shared data receiving unit 52, update information receiving unit 53, update information storage unit 54 and update information reflecting unit 55.

Here, download request unit 51 transmits a download request signal for requesting downloading of shared data to any terminal belonging to the same group.

Shared data receiving unit 52 receives shared data transmitted from the terminal that has received a download request signal.

Update information receiving unit 53 receives update information transmitted from the simultaneous multicast transmission terminal from the terminal that has received a download request signal.

Update information storage unit 54 stores update information that has been received by update information receiving unit 53.

Update information reflecting unit 55 updates shared data stored in shared data storage unit 10 using update information stored in update information storage unit 54 in the case downloading of shared data has been completed normally.

[1.2.1.6] Detailed Configuration of Relay Transmission Control Unit

Next, an explanation is provided of the detailed configuration of relay transmission control unit 60 with reference to FIG. 2. Relay transmission control unit 60 performs control during downloading of shared data to a terminal that has joined the game after the game has started. As shown in FIG. 2, relay transmission control unit 60 is equipped with download request receiving unit 61, shared data transmission unit 62 and update information relay unit 63.

Here, download request receiving unit 61 receives a download request signal transmitted from the newly added terminal.

Shared data transmission unit 62 downloads shared data to a newly added terminal. Moreover, shared data transmission unit 62 transmits update information received from the simultaneous multicast transmission terminal to a newly added terminal, and transmits a relay transmission start signal for relay transmission to update information relay unit 63.

Update information relay unit 63 then relays the above transmission.

[1.2.2] Terminal Hardware Configuration

Figure 4:
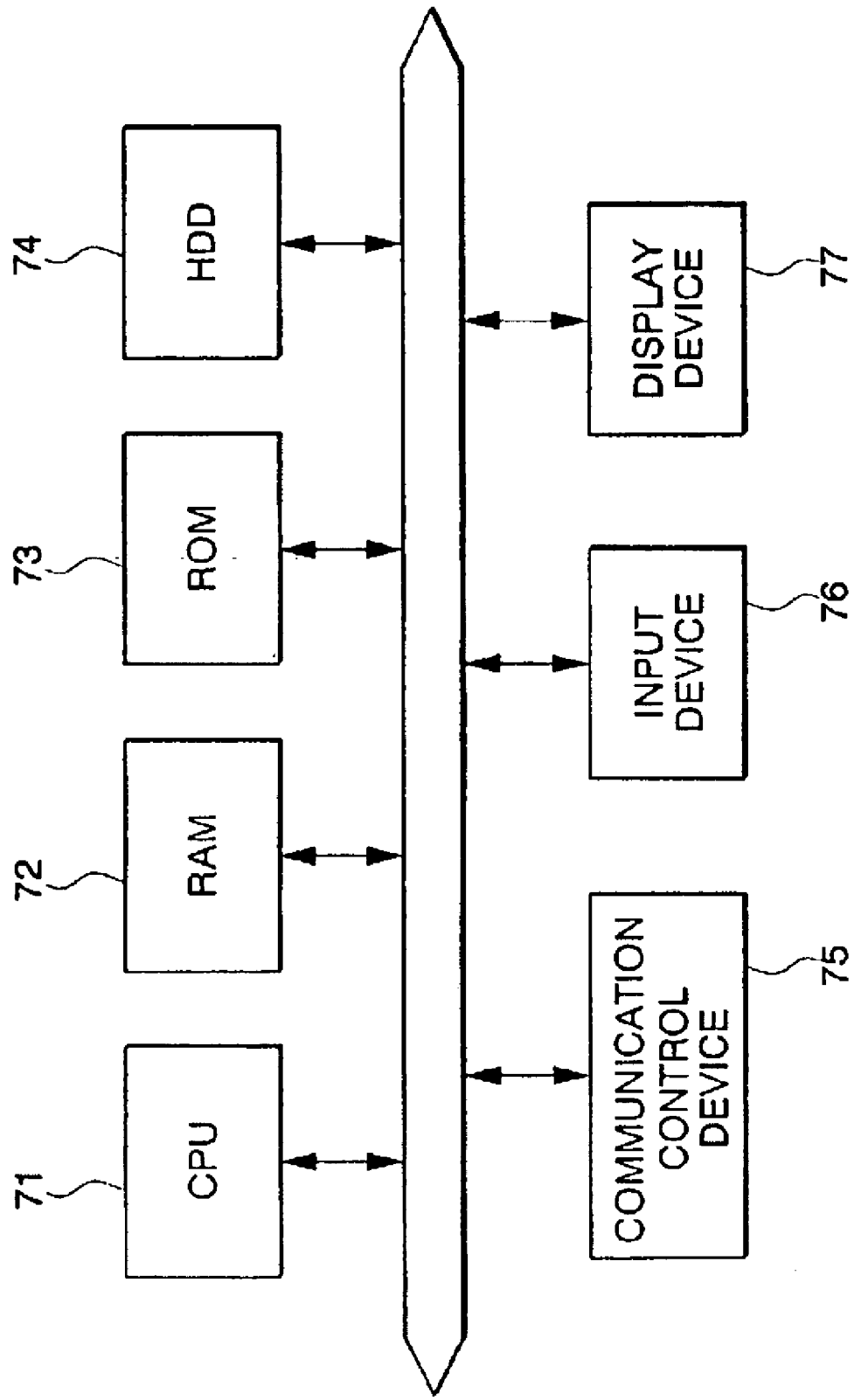
FIG. 4 is a drawing showing the hardware configuration of the terminal shown in FIG. 1.

Next, an explanation is provided of the hardware configuration of terminals 5 with reference to FIG. 4.

As shown in FIG. 4, each terminal 5 is equipped with, for example, central processing unit (CPU) 71, read-only memory (ROM) 73, random access memory (RAM) 72, auxiliary storage device (HDD) 74, communication control device 75, input device 76 and display device 77. These devices are interconnected via bus (BUS) 78.

Here, CPU 71 controls arithmetic processing, control processing and so forth. ROM 73 stores various control programs. RAM 72 temporarily stores the program currently being run and data. HDD 74 stores, for example, the program for controlling the above-mentioned simultaneous multicast transmission request control unit 20, simultaneous multicast transmission controller 30, shared data update control unit 40, download control unit 50 and relay transmission control unit 60. Communication control device 75 serves as a connection interface when connecting with other terminals via a network. Input device 76 is a device for input of various data. Display device 77 is a device that displays, for example, processing results.

Furthermore, auxiliary storage device 74 may be built into terminal 5 or connected externally. In addition, auxiliary storage device 74 is not required to be provided in all terminals 5. Terminals 5 may be equipped with, for example, a device for reading the recording medium of a CD-ROM device or DVD-ROM device instead of auxiliary storage device 74. In this case, the above CD-ROM device or DVD-ROM device reads a CD or DVD on which is stored, for example, a program for controlling the above-mentioned simultaneous multicast transmission request control unit 20, simultaneous multicast transmission controller 30, shared data update control unit 40, download control unit 50 and relay transmission control unit 60.

Input device 76 and display device 77 are not necessarily required to be provided in terminal 5. For example, in the case a single terminal belongs to a plurality of groups at the same time, a single terminal logically functions as a plurality of terminals. Consequently, in the case input device 76 and display device 77 are physically occupied by a logical terminal belonging to a certain group, input device 76 and display device 77 may not be provided in other logical terminals.

[2] Operation of the Embodiment

[2.1] Basic Operation of Simultaneous Multicast Transmission

Figure 5:
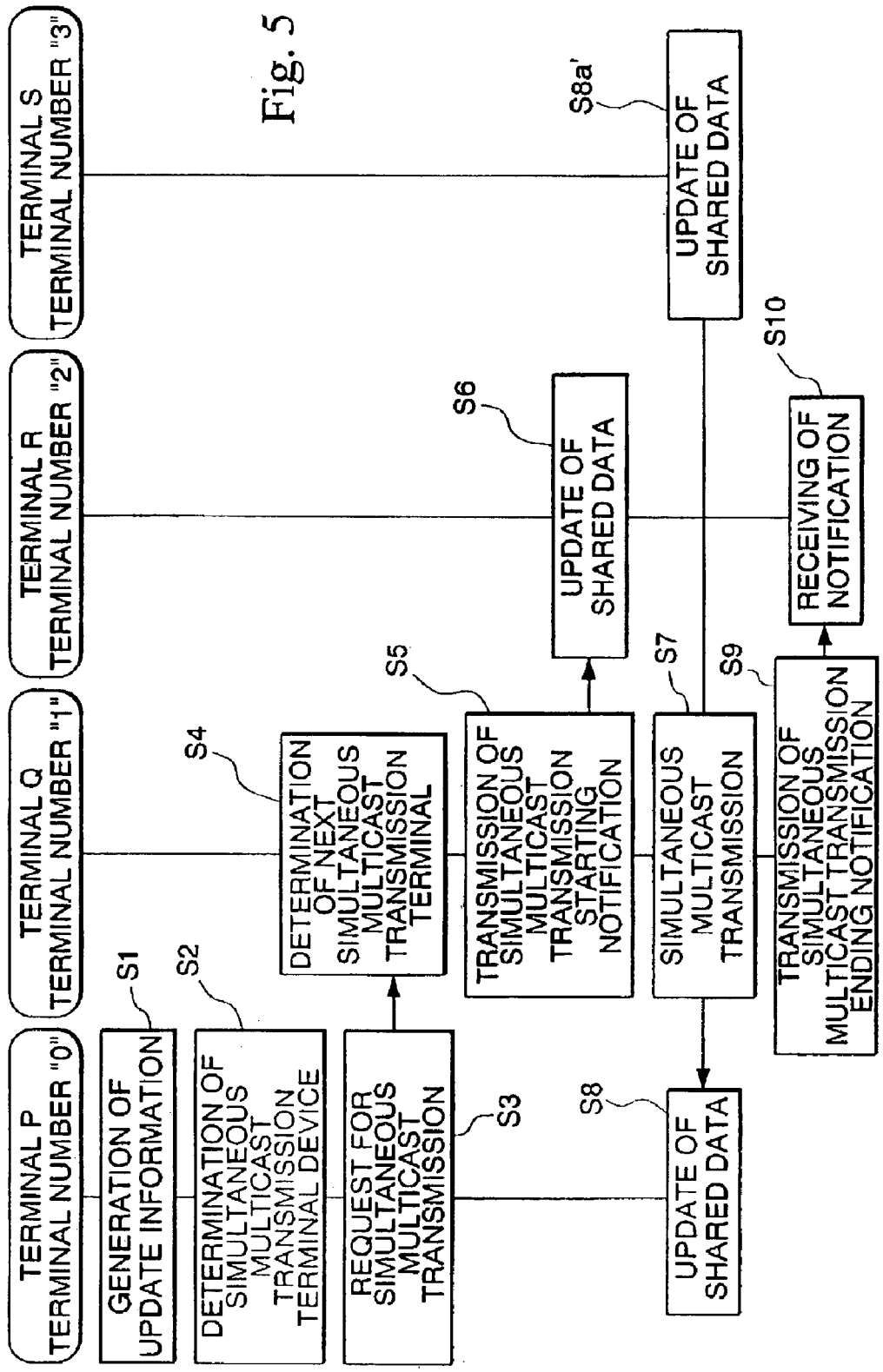
FIG. 5 is a sequence drawing showing the basic operation of simultaneous multicast transmission in the above embodiment.

Next, an explanation is provided of an example of the basic operation of simultaneous multicast transmission with reference to FIG. 5.

Figure 13:
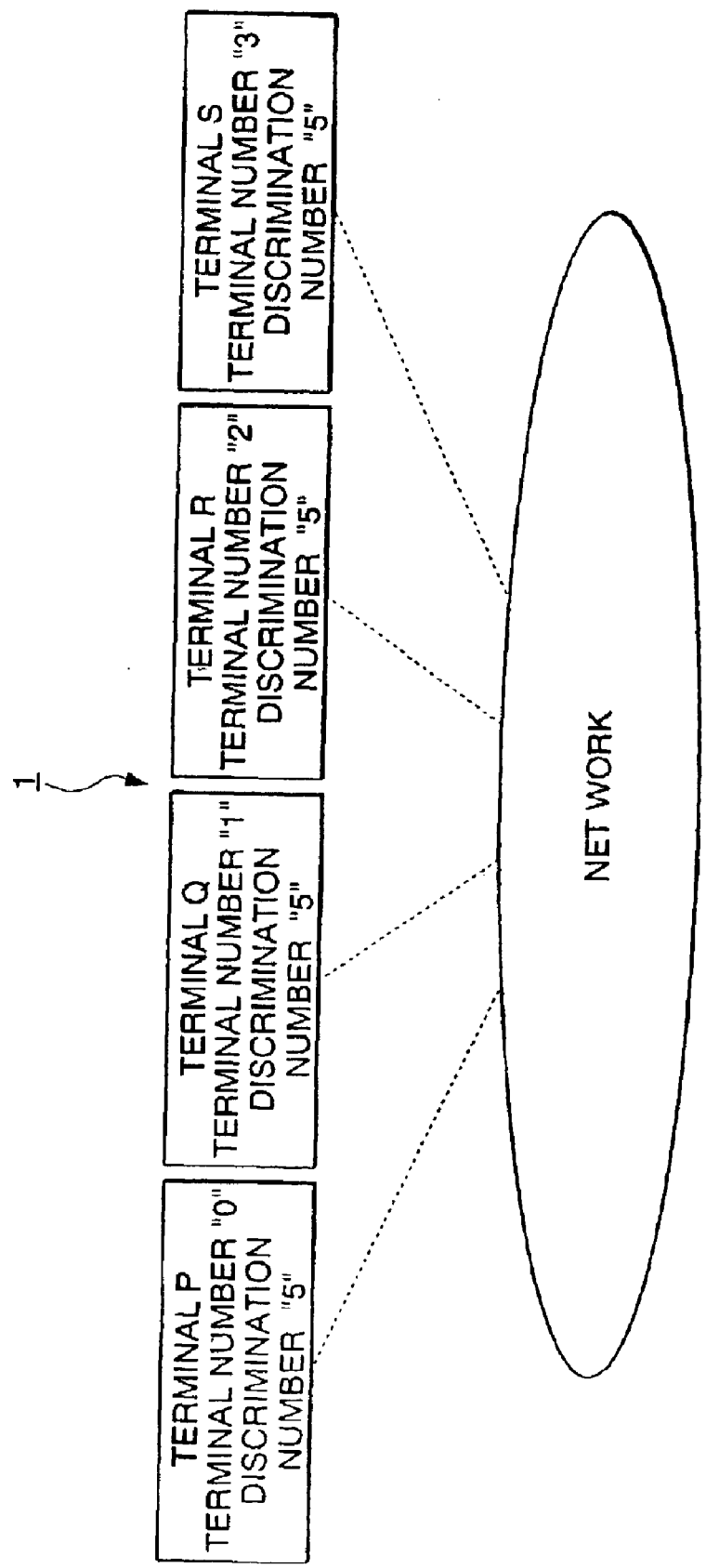
FIG. 13 is a drawing showing the prerequisites of each terminal in an operation example of the above embodiment.

Here, an explanation is provided of the prerequisites of this operation. As shown in FIG. 13, consecutive integers starting from "0" of "0", "1", "2" and "3" are respectively assigned as terminal numbers to each terminal P, Q, R and S. In addition, a "5" is currently housed as the discrimination number in discrimination number data 11 of each terminal P, Q, R and S.

For example, in the case an update is generated for shared data in terminal P (Step S1), transmission destination determination unit 21 of terminal P determines a simultaneous multicast transmission terminal based on a predetermined algorithm (Step S2).

Here, a specific explanation is provided of the method for determining the simultaneous multicast transmission terminal. For example, in the case of the group shown in FIG. 5, the current discrimination number is "5", and the current number of terminals belonging to the group is 4 (calculated from member data 12). Thus, when these values are entered into the above-mentioned [Formula 1]. the following result is determined: 5 mod 4=1. As a result, terminal Q to which "1" has been assigned as the terminal number is determined to be the simultaneous multicast transmission terminal that simultaneously transmits the generated update information to all terminals belonging to the same group.

Next, simultaneous multicast transmission request transmission unit 22 of terminal P transmits update data X generated as a result of shared data being updated, discrimination number "5" that is currently registered in the shared data, and a simultaneous multicast transmission request signal that requests simultaneous multicast transmission, to terminal Q serving as the simultaneous multicast transmission terminal (Step S3).

Next, transmission destination determination unit 21 of terminal Q determines the transmission device to serve as the next simultaneous multicast transmission terminal based on a predetermined prescribed algorithm (Step S4).

Here, a specific explanation is provided of the method for determining the next simultaneous multicast transmission terminal. For example, the discrimination number is taken to be "6" by adding "1" to the "5" which is the discrimination number currently registered in the shared data. When this new discrimination number, "6", and the total number of terminals in the group, "4", are entered into the above-mentioned [Formula 1], the following result is determined: 6 mod 4=2. As a result, terminal R, to which "2" is assigned as the terminal number, is determined to be the simultaneous multicast transmission terminal that simultaneously transmits the next generated update information to all terminals belonging to the same group.

Next, simultaneous multicast transmission notification transmission unit 34 of terminal Q transmits a simultaneous multicast transmission starting notification that indicates starting of simultaneous multicast transmission to terminal R which is the next simultaneous multicast transmission terminal. In addition, simultaneous multicast transmission execution unit 33 of terminal Q transmits update information X and the new discrimination number, "6", to terminal R which is the next simultaneous multicast transmission terminal (Step S5).

Furthermore, in terminal Q, update information X and shared data housed in shared data storage unit 10, for which discrimination number "6" is used, are updated by shared data update control unit 40.

Simultaneous multicast transmission notification receiving unit 31 of terminal R recognizes that simultaneous multicast transmission has started by receiving a simultaneous multicast transmission starting notification transmitted from terminal Q. Shared data update control unit 40 of terminal R then updates update information X received from terminal Q and shared data housed in shared data storage unit 10 using discrimination number "6" (Step S6).

In addition, simultaneous multicast transmission execution unit 33 of terminal Q simultaneously transmits update information X and the new discrimination number "6" to terminals P and S corresponding to the terminal identification codes housed in member data 12 (Step S7).

Shared data update control unit 40 of terminals P and S then updates update information X received from terminal Q, which is the simultaneous multicast transmission terminal, and shared data housed in shared data storage unit 10 using discrimination number "6" (Steps S8 and S8').

Next, simultaneous multicast transmission, notification transmission unit 34 of terminal Q transmits a simultaneous multicast transmission ending notification indicating that simultaneous multicast transmission has ended to terminal R which is the next simultaneous multicast transmission terminal (Step S9).

Simultaneous multicast transmission notification receiving unit 31 of terminal R then recognizes that simultaneous multicast transmission has ended by receiving the simultaneous multicast transmission ending notification transmitted from terminal Q (Step S1).

Figure 6:
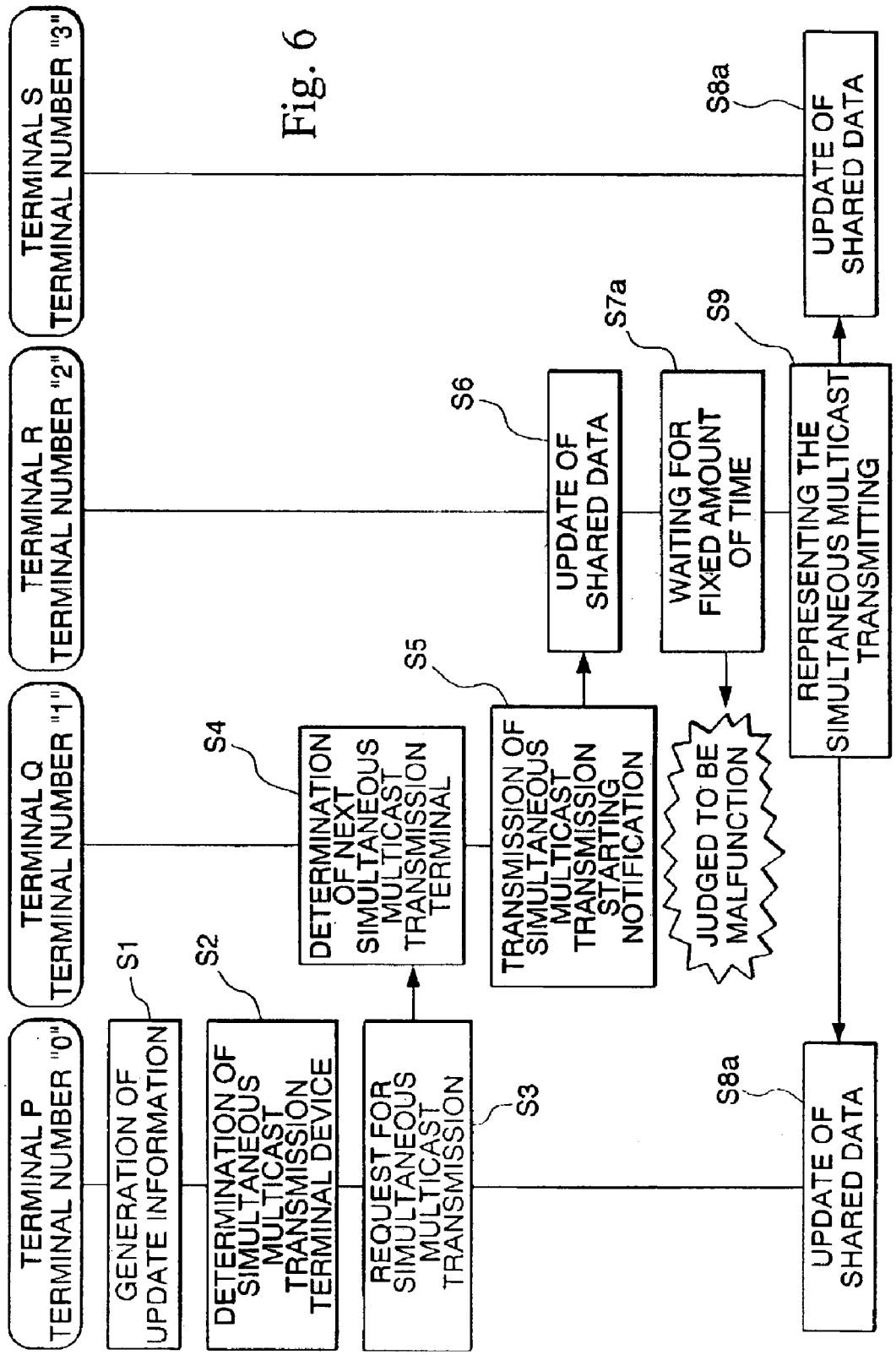
FIG. 6 is a sequence drawing showing operation in the case a simultaneous multicast transmission terminal does not complete simultaneous multicast transmission normally in the above embodiment.

[2.2] Operation in Case of Simultaneous Multicast Transmission by Simultaneous Multicast Transmission Terminal Not Ending Normally Next, an explanation is provided of the example of operation in the case simultaneous multicast transmission by the simultaneous multicast transmission terminal does not end normally with reference to FIG. 6.

Here, an explanation is provided of the prerequisites for this operation. As shown in FIG. 13, consecutive integers starting from "0" of "0", "1", "2" and "3" are respectively assigned as terminal numbers to each terminal P, Q, R and S. In addition, a "5" is currently housed as the discrimination number in discrimination number data 11 of each terminal P, Q, R and S.

In addition, the same reference symbols are assigned for those steps indicated in FIG. 6 in which processing is performed that are similar to the steps indicated in FIG. 5 that was referred to when explaining basic operation of simultaneous multicast transmission in the previously mentioned section [2.1], and their detailed explanation is omitted.

To begin with, in Step S6 indicated in FIG. 6, simultaneous multicast transmission notification receiving unit 31 of terminal R recognizes that simultaneous multicast transmission has started by receiving the simultaneous multicast transmission starting notification transmitted from terminal Q. Shared data update control unit 40 of terminal R then updates update information X received from terminal Q and shared data stored in shared data storage unit 10 using discrimination number "6".

Next, simultaneous multicast transmission notification receiving unit 31 of terminal R waits for a predetermined amount of time in order to receive a simultaneous multicast transmission ending notification transmitted from terminal Q (Step S7).

In Step S7, in the case a simultaneous multicast transmission ending notification is unable to be received from terminal Q even though simultaneous multicast transmission notification receiving unit 31 of terminal R has waited for the prescribed amount of time, simultaneous multicast transmission execution unit 33 simultaneously transmits update information X and a new discrimination number "6" to terminals P and S corresponding to each terminal identification code housed in member data 12 (Step S8*a*).

Shared data update control unit 40 of terminals P and S then updates update information X received from terminal R and shared data housed in shared data storage unit 10 using discrimination number "6" (Step S8*a* and S8*a'*).

Figure 7:
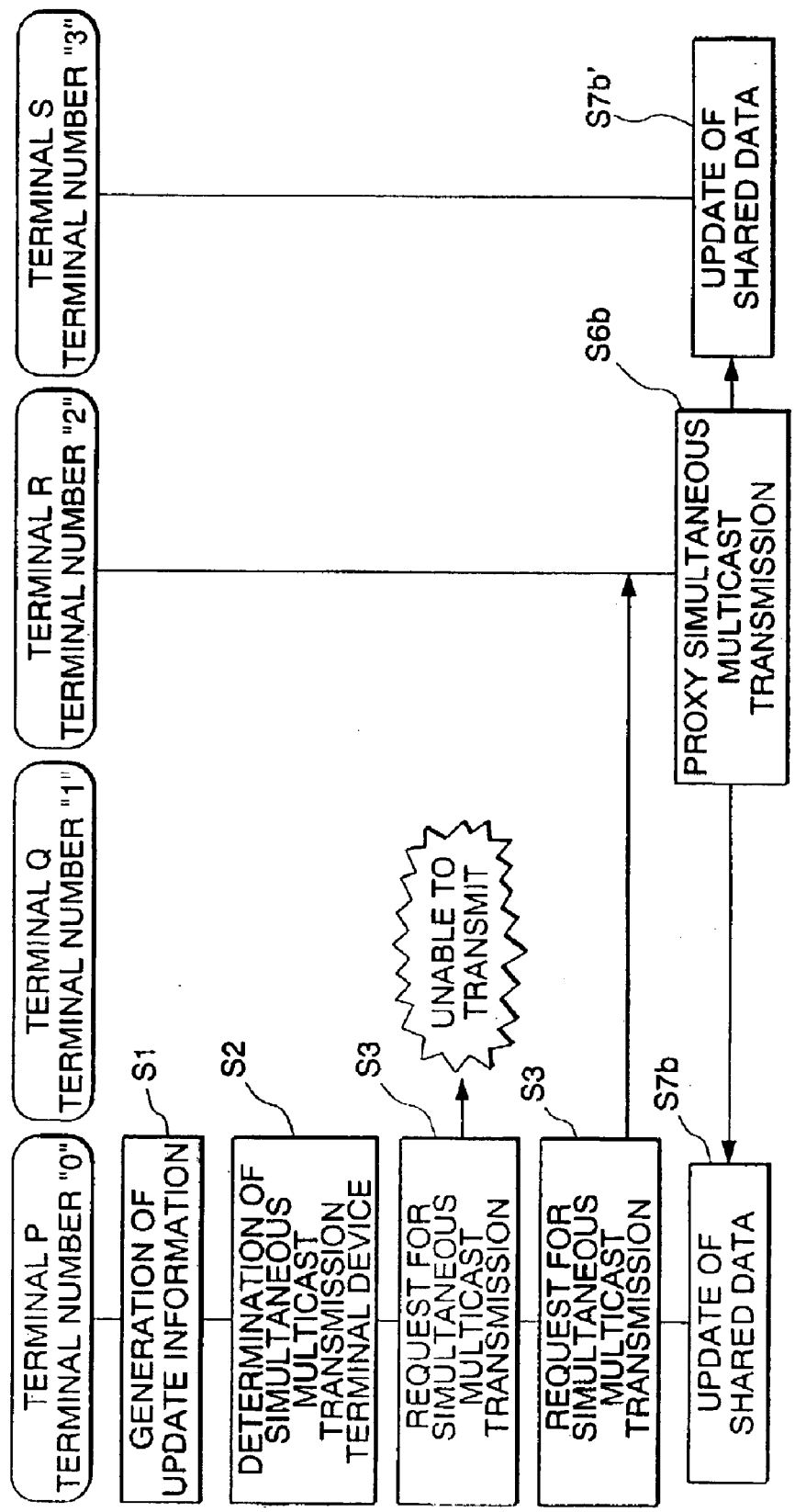
FIG. 7 is a sequence drawing showing operation in the case of being unable to transmit normally to a simultaneous multicast transmission terminal in the above embodiment.

[2.3] Operation in Case of Not Being Able to Normally Transmit to the Simultaneous Multicast Transmission Terminal Next, an explanation is provided of an example of operation in the case of being unable to normally transmit to the simultaneous multicast transmission terminal with reference to FIG. 7.

Here, an explanation is provided of the prerequisites for this operation. As shown in FIG. 13, consecutive integers starting from "0" of "0", "1", "2" and "3" are respectively assigned as terminal numbers to each terminal P, Q, R and S. In addition, a "5" is currently housed as the discrimination number in discrimination number data 11 of each terminal P, Q, R and S.

In addition, the same reference symbols are assigned for 42. those steps indicated in FIG. 7 in which processing is performed that are similar to the steps indicated in FIG. 5 that was referred to when explaining basic operation of simultaneous multicast transmission in the previously mentioned section [2.1], and their detailed explanation is omitted.

To begin with, in Step S3 shown in FIG. 7, simultaneous multicast transmission request transmission unit 21 of terminal P transmits update information X, which is generated by renewing shared data, the discrimination number "5" currently registered in the shared data, and a simultaneous multicast transmission request signal that requests simultaneous multicast transmission, to terminal Q which is the simultaneous multicast transmission terminal.

Next, in the case it is judged by malfunction judgment unit 23 of terminal P that update information X, the discrimination number and the simultaneous multicast transmission request signal were not normally transmitted to terminal Q (Step S4*b*), transmission destination determination unit 21 determines a terminal to serve as the simultaneous multicast transmission terminal instead of terminal Q (Step S5*b*).

Here, a detailed explanation is provided of the method for determining the proxy simultaneous multicast transmission terminal. For example, the discrimination number is taken to be "6" by adding "1" to the "5" that is the discrimination number currently registered in shared data. When this new discrimination number, "6", and the total number of terminals, "4", are entered into the previously mentioned [Formula 1], the following result is determined: 6 mod 4=2. As a result, terminal R to which a "2" is assigned as the discrimination number is determined to be the simultaneous multicast transmission terminal that performs simultaneous multicast transmission instead of terminal Q.

Next, simultaneous multicast transmission execution unit 33 of terminal R then simultaneously transmits update information X and the new discrimination number "6" to terminals P and S corresponding to each terminal identification code housed in member data 12 (Step S6*b*).

Furthermore, in terminal R, update information X and shared data housed in shared data storage unit 10, for which the registration number "6" was used, are updated by shared data update control unit 40.

Shared data update control unit 40 of terminals P and S then updates update information X received from terminal R and shared data housed in shared data storage unit 10 using discrimination number "6" (Steps S7*b* and S7*b'*).

[2.4] Operation in Case of Deleting a Terminal

Figure 8:
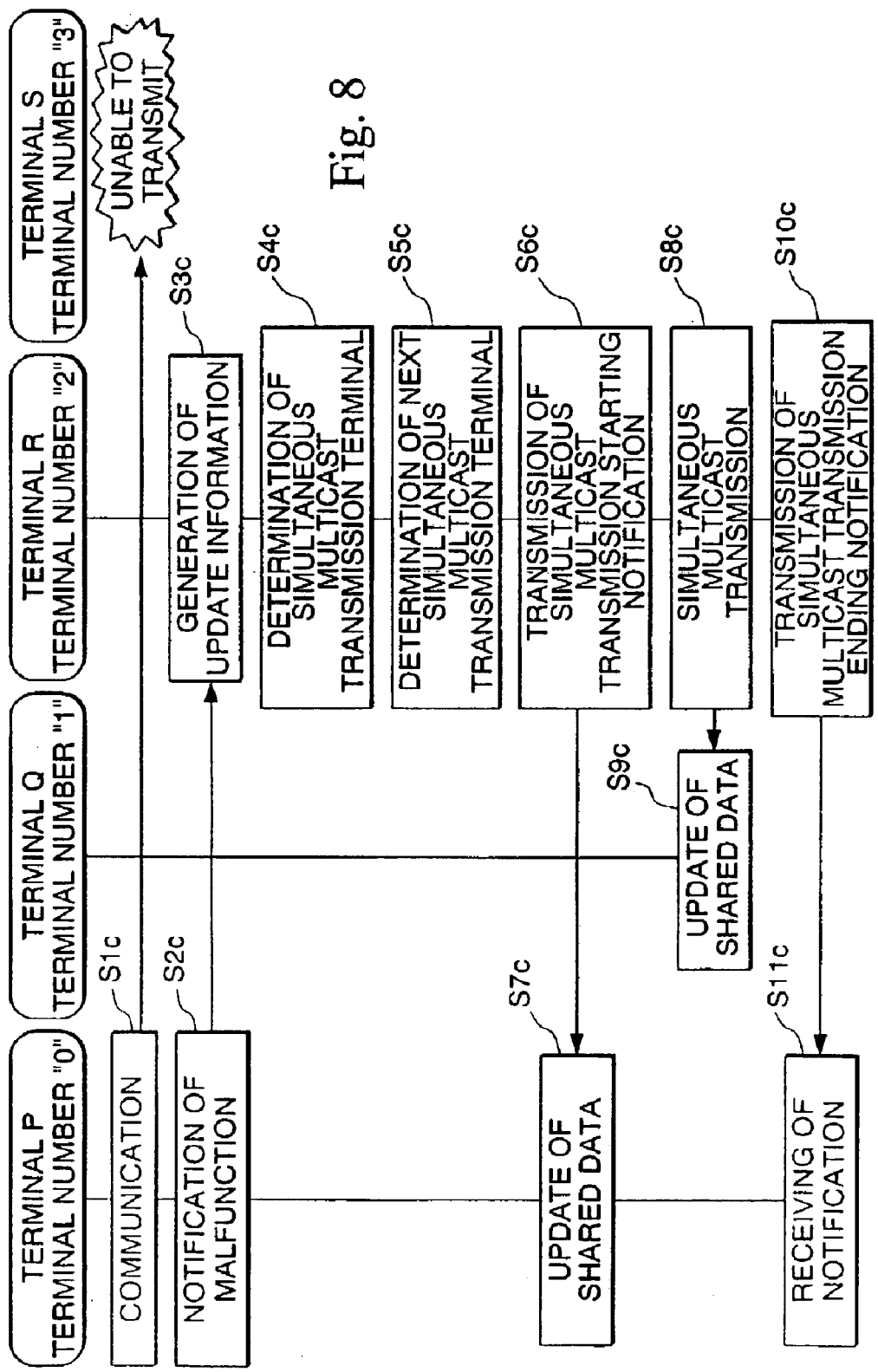
FIG. 8 is a sequence drawing showing operation in the case of deleting a terminal in the above embodiment.

An explanation is provided of an example of operation in the case of a deleting a terminal with reference to FIG. 8.

Here, an explanation is provided of the prerequisites for this operation. As shown in FIG. 13, consecutive integers starting from "0" of "0", "1", "2" and "3" are respectively assigned as terminal numbers to each terminal P, Q, R and S. In addition, a "5" is currently housed as the discrimination number in discrimination number data 11 of each terminal P, Q, R and S.

To begin with, terminal P performs some form of communication with terminal S. In the case some form of response is not obtained from terminal S as a result of that communication, terminal P judges that terminal S has malfunctioned (Step S1c).

Next, terminal P notifies to the effect that terminal S has malfunctioned to the terminal corresponding to the first registered terminal identification code among each terminal identification code housed in member data 12. In this operation example, the terminal corresponding to the first registered terminal identification code is assumed to be terminal R. Thus, terminal P notifies terminal R to the effect that terminal S has malfunctioned (Step S2c).

Terminal R, after having received the notification that terminal S has malfunctioned, generates update information that deletes data corresponding to terminal S from member data 12 (Step S3c). Transmission destination determination unit 21 of terminal R then determines the simultaneous multicast transmission terminal based on a predetermined prescribed algorithm (Step S4c).

Here, an detailed explanation is provided of the method for determining the simultaneous multicast transmission terminal. For example, in the case of the group shown in FIG. 8, the discrimination number currently registered in shared data is "5", and the number of terminals currently belonging to the group is "3". Thus, when these values are entered into the above-mentioned [Formula 1], the following result is determined: 5 mod 3=2. As a result, terminal R itself, to which "2" has been assigned as the discrimination number, is determined to be the simultaneous multicast transmission terminal that simultaneously transmits the recently generated update information to all terminals belonging to the same group.

Next, transmission destination determination unit 21 of terminal R determines the terminal to serve as the next simultaneous multicast transmission terminal based on a predetermined prescribed algorithm (Step S5c).

Here, a specific explanation is provided of the method for determining the next simultaneous multicast transmission terminal. For example, the discrimination number is taken to be "6" by adding "1" to the "5" which is the discrimination number currently registered in the shared data. When this new discrimination number, "6", and the total number of terminals in the group, "3", are entered into the abovementioned [Formula 1], the following result is determined: 6 mod 3=0. As a result, terminal P, to which "0" is assigned as the terminal number, is determined to be the next simultaneous multicast transmission terminal.

Next, simultaneous multicast transmission notification transmission unit 34 of terminal R transmits a simultaneous multicast transmission starting notification that indicates starting of simultaneous multicast transmission to terminal P which is the next simultaneous multicast transmission terminal. In addition, simultaneous multicast transmission execution unit 33 of terminal R transmits update information X and the new discrimination number. "6", to terminal P which is the next simultaneous multicast transmission terminal (Step S6c).

Simultaneous multicast transmission notification receiving unit 31 of terminal P recognizes that simultaneous multicast transmission has started by receiving the simultaneous multicast transmission starting notification transmitted from terminal R. Shared data update control unit 40 of terminal P then updates update information X received from terminal R and shared data housed in shared data storage unit 10 using discrimination number "6" (Step S7c).

In addition, simultaneous multicast transmission execution unit 33 of terminal R simultaneously transmits update information X and the new discrimination number "6" to terminal Q corresponding to the terminal identification code housed in member data 12 (Step S8c).

Shared data update control unit 40 of terminal Q then updates update information X received from terminal R, which is the simultaneous multicast transmission terminal, and shared data housed in shared data storage unit 10 using discrimination number "6" (Steps S9c).

Next, simultaneous multicast transmission notification transmission unit 34 of terminal R transmits a simultaneous multicast transmission ending notification indicating that simultaneous multicast transmission has ended to terminal P which is the next simultaneous multicast transmission terminal (Step S10c).

Simultaneous multicast transmission notification receiving unit 31 of terminal P then recognizes that simultaneous multicast transmission has ended by receiving the simultaneous multicast transmission ending notification transmitted from terminal Q (Step S11c).

[2.5] Operation in Case of Terminal Withdrawing from the Group

Figure 9:
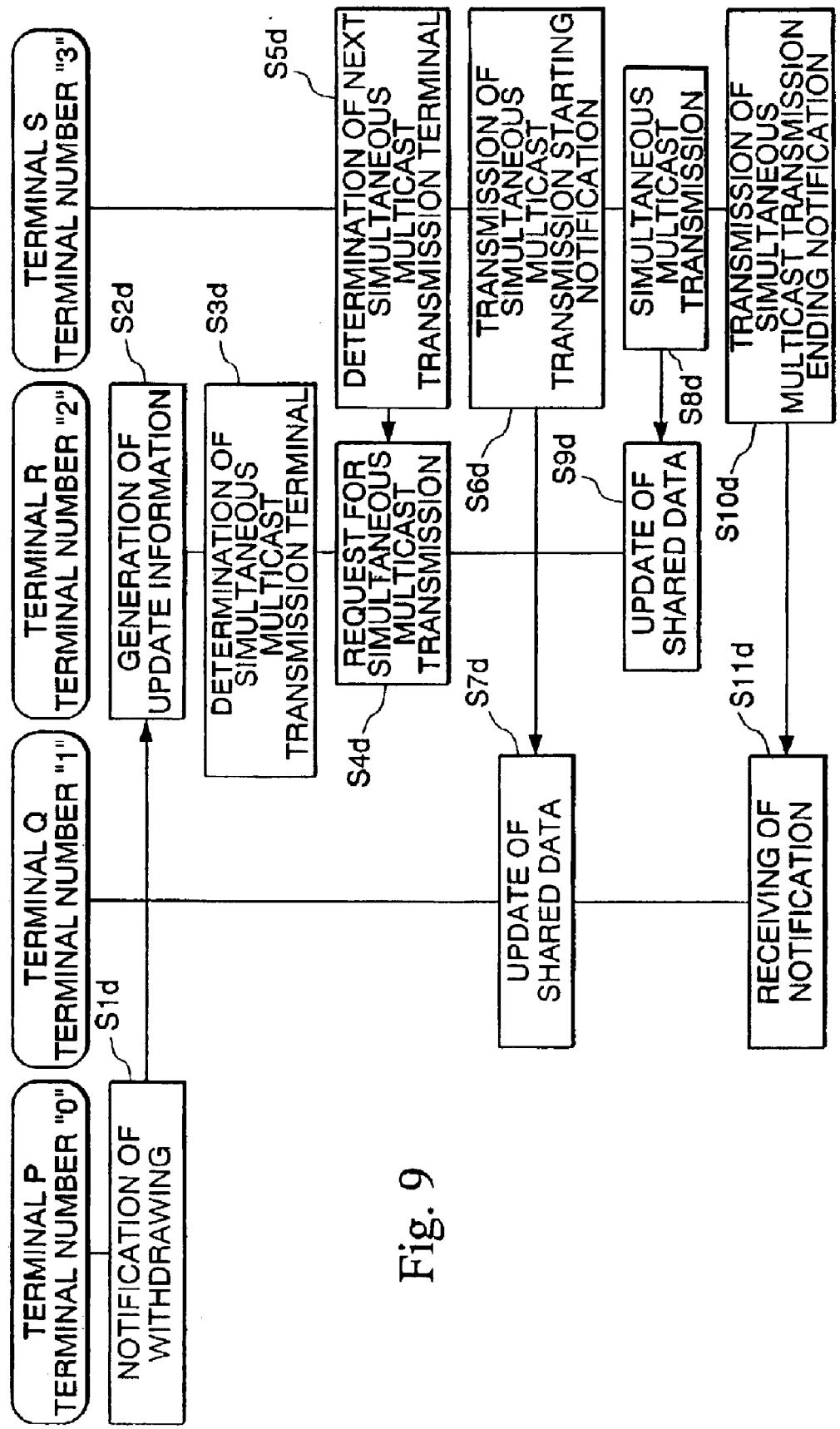
FIG. 9 is a sequence drawing showing operation in the case a terminal withdraws from the group in the above embodiment.

An explanation is provided of an example of operation in the case a terminal withdraws from the group with reference to FIG. 9.

Here, an explanation is provided of the prerequisites for this operation. As shown in FIG. 13, consecutive integers starting from "0" of "0", "1", "2" and "3" are respectively assigned as terminal numbers to each terminal P, Q, R and S. In addition, a "5" is currently housed as the discrimination number in discrimination number data 11 of each terminal P, Q, R and S.

An explanation is provided of the case in which, for example, terminal P withdraws from the group. To begin with, terminal P notifies to the effect that terminal P will withdraw from the group to, for example, the terminal corresponding to the first registered terminal identification code among each terminal identification code housed in member data 12. In this operation example, the terminal corresponding to the first registered terminal identification code is assumed to be terminal R. Thus, terminal P notifies terminal R to the effect that terminal P will withdraw from the group (Step S1d).

Terminal R, after having received the notification that terminal P will withdraw from the group, generates update information that deletes data corresponding to terminal P from member data 12 (Step S2d). Transmission destination determination unit 21 of terminal R then determines the simultaneous multicast transmission terminal based on a predetermined prescribed algorithm (Step S3d).

Here, an detailed explanation is provided of the method for determining the simultaneous multicast transmission terminal. For example, in the case of the group shown in FIG. 9, the discrimination number currently registered in shared data is "5", and the number of terminals currently belonging to the group is "3". Thus, when these values are entered into the above-mentioned [Formula 1], the following result is determined: 5 mod 3=2.

Terminal R then generates update information that changes the assignment of terminal numbers of member data 12 at the point update information is generated that deletes data corresponding to terminal P from member data 12.

More specifically, the terminal numbers of terminals Q, R and S are changed to "0", "1" and "2". As a result, terminal S, to which "2" is assigned as the terminal number, is determined to be the simultaneous multicast transmission terminal that simultaneously transmits the recently generated update information to all terminals belonging to the same group.

Next, simultaneous multicast transmission request transmission unit 22 of terminal R transmits update information X generated as a result of update information being updated, the discrimination number "5" currently registered in shared data, and a simultaneous multicast transmission request signal that requests simultaneous multicast transmission, to terminal S which is the simultaneous multicast transmission terminal (Step S4d).

Next, transmission destination determination unit 21 of terminal S determines the terminal to serve as the next simultaneous multicast transmission terminal based on a predetermined prescribed algorithm (Step S5d).

Here, a specific explanation is provided of the method for determining the next simultaneous multicast transmission terminal. For example, the discrimination number is taken to be "6" by adding "1" to the "5" which is the discrimination number currently registered in the shared data. When this new discrimination number, "6", and the total number of terminals in the group, "3", are entered into the above-mentioned [Formula 1], the following result is determined: 6 mod 3=0. As a result, terminal Q, to which "0" is assigned as the terminal number, is determined to be the next simultaneous multicast transmission terminal.

Next, simultaneous multicast transmission notification transmission unit 34 of terminal S transmits a simultaneous multicast transmission starting notification that indicates starting of simultaneous multicast transmission to terminal Q which is the next simultaneous multicast transmission terminal. In addition, simultaneous multicast transmission execution unit 33 of terminal S transmits update information X and the new discrimination number, "6", to terminal Q which is the next simultaneous multicast transmission terminal (Step S6d).

Simultaneous multicast transmission notification receiving unit 31 of terminal Q recognizes that simultaneous multicast transmission has started by receiving the simultaneous multicast transmission starting notification transmitted from terminal S. Shared data update control unit 40 of terminal Q then updates update information X received from terminal S and shared data housed in shared data storage unit 10 using discrimination number "6" (Step S7d).

In addition, simultaneous multicast transmission execution unit 33 of terminal S transmits update information X and the new discrimination number "6" to terminal R corresponding to the terminal identification code housed in member data 12 (Step S8d).

Shared data update control unit 40 of terminal R then updates update information X received from terminal S, which is the simultaneous multicast transmission terminal, and shared data housed in shared data storage unit 10 using discrimination number "6" (Steps S9d).

Next, simultaneous multicast transmission notification transmission unit 34 of terminal S transmits a simultaneous multicast transmission ending notification indicating that simultaneous multicast transmission has ended to terminal Q which is the next simultaneous multicast transmission terminal (Step S10d).

Simultaneous multicast transmission notification receiving unit 31 of terminal Q then recognizes that simultaneous multicast transmission has ended by receiving the simultaneous multicast transmission ending notification transmitted from terminal S (Step S11d).

[2.6] Operation in Case of Adding a Terminal

An explanation is provided of an example of operation in the case of adding a terminal with reference to FIGS. 10 through 12.

[2.6.1] General Operation in Case of Adding a Terminal

To begin with, an explanation is provided of the general operation in the case of adding a terminal with reference to FIGS. 10 and 11.

The drawings shown in FIGS. 10 and 11 represent the state of the case of terminal S being newly added to a computer system group composed of terminals P, Q and R.

The state shown in FIG. 10 represents the state in which, for example, terminal S requests terminal R to add said terminal S to the group. In this case, terminal R downloads shared data housed in shared data storage unit 10 to terminal S.

Next, the state shown in FIG. 11 represents a state in the case update information has been generated for shared data in the group composed of terminals P, Q and R during downloading from terminal R to terminal S. In this state, terminal R, which has received the update information, relay transmits said update information to terminal S in the form of different data from the downloaded data. Moreover, in this state, terminal R generates update information for registering terminal S in member data 12, and transmits the generated update information to the simultaneous multicast transmission terminal at that time. As a result, said update information is simultaneously transmitted, and member data housed in all terminals belonging to the same group is updated.

As a result of this updating, terminal S is registered in member data 12. As a result, terminal S is able to receive all following update information generated in the group by simultaneous multicast transmission from the simultaneous multicast transmission terminal. Thus, at any time later, terminal R is not required to relay transmit said update information to terminal S even if update information transmitted by simultaneous multicast transmission is received.

Said group is then composed of the four terminals consisting of P, Q, R and S at the point all downloading is completed.

[2.5.2] Detailed Operation in Case of Adding a Terminal

Next, an explanation is provided of the detailed operation in the case of adding a terminal with reference to FIG. 12.

To begin with, download request unit 51 of terminal S that has been newly added to the group of a computer system transmits a download request signal for requesting downloading of shared data to terminal R (Step S1e).

Download request receiving unit 61 of terminal R that has received the download request signal then transmits a download receive signal indicating that the download request signal from terminal S has been received to shared data transmission unit 62. Shared data transmission unit 62 then transmit shared data stored in shared data storage unit 10 to terminal S in the form of download data (Step S2e). Shared data transmission unit 62 then transmits a relay transmission starting signal to update information relay unit 63 that starts relay transmission in which update information received from the simultaneous multicast transmission terminal is transmitted to terminal S.

Shared data receiving unit 52 of terminal S that has received download data from terminal R registers the received download data in shared data storage unit 10 (Step S3e).

In the case information data for updating shared data has been generated within the group, said update information is transmitted to terminal R from simultaneous multicast transmission execution unit 33 of the simultaneous multicast transmission terminal (for example, terminal Q) that has been uniquely determined by a prescribed algorithm (Step S4e).

Shared data update control unit 40 of terminal R updates shared data housed in shared data storage unit 10 using the received update information. Shared data control unit 40 then transmits the received update information to update information relay unit 63.

Update information relay unit 63 transmits the received update information to terminal S (Step S5e).

Update information receive unit 53 of terminal S that has received update information from terminal R registers the received update information in update information storage unit 54 (Step S6e).

Next, simultaneous multicast transmission request transmission unit 22 of terminal R transmits update information for newly registering terminal S in member data 12 to the simultaneous multicast transmission terminal (for example, terminal Q) determined by transmission destination determination unit 21 (Step S7e).

Simultaneous multicast transmission execution unit 33 of terminal Q simultaneously transmits update information to other terminals in the group (Step S8e).

Shared data update control unit 40 of terminal R updates members data of the shared data housed in shared data storage unit 10 using the received update information. Shared data update control unit 40 then transmits the received update information to update information relay unit 63. Update information relay unit 63 then transmits the received update information to terminal S (Step S9e).

Update information receiving unit 53 of terminal S that has received update information from terminal R registers the received update information in update information storage unit 54 (Step S10e).

Next, in the case the contents of update information relay transmitted to terminal S by update information relay unit 63 of terminal R were contents for newly registering terminal S in member data 12, relay transmission control unit 60 stops the relay of update information by update information relay unit 63 (Step S11e). As a result, update information relay unit 63 does not relay transmit update information to terminal S even if update information is received after that time.

In addition, in terminal S, in the case download from terminal R has ended (Step S12e), update information reflecting unit 55 updates shared data housed in shared data storage unit 10 using the update information stored in update information storage unit 54 (Step S13e).

[3] Effect of the Embodiment

As has been described above, in the present embodiment, the number of simultaneous multicast transmission terminals is limited to one, and the terminals within the group are assigned the role of the simultaneous multicast transmission terminal in order. As a result, the processing load borne by each terminal when serving as the simultaneous multicast transmission terminal is significantly less in comparison with the processing load borne by a fixed server device in a system in which said server device is installed.

In addition, in the present embodiment, simultaneous multicast transmission is performed by assigning discrimination numbers for update information generated for shared data. As a result, each terminal in the group is able to update shared data in the order in which update information is generated.

In addition, in the present embodiment, update information generated for member data is also the target of simultaneous multicast transmission by assigning discrimination numbers in the same manner as basic data. Moreover, in the present embodiment, discrimination numbers housed in each terminal in the group are managed to be the same. As a result, the simultaneous multicast transmission terminal is able to perform simultaneous multicast transmission based on member data that has been unified within the group. Thus, the consistency of shared data housed in all terminals belonging to the same group can be maintained.

In addition, in the present embodiment, relay transmission control unit 60 transmits update information generated in another terminal in the group to a newly added terminal. As a result, even before member data pertaining to the newly added terminal is registered in each terminal in the group, the newly added terminal is able to receive update information generated in another terminal in the group. Thus, the consistency of shared data in each terminal in the groups, including the newly added terminal, can be maintained.

[4] Variations of the Embodiment

[4.1] First Variation

Furthermore, in the above-mentioned embodiment, although all terminals in the group are eligible to become the simultaneous multicast transmission terminal, it is not always necessary that all terminals be eligible to become the simultaneous multicast transmission terminal. For example, prescribed reference values may be established for the specifications information of member data, and only those terminals that exceed those reference values may be eligible for becoming the simultaneous multicast transmission terminal. As a result, terminals having low processing capacity can be excluded from being eligible for becoming the simultaneous multicast transmission terminal.

In order to carry this out in the above embodiment, terminal numbers are only assigned to those terminals that exceed the reference values. Moreover, the total number of terminals in the group is calculated for only those terminals that exceed the reference values.

[4.2] Second Variation

In addition, in the above-mentioned embodiment, although notification of the deletion or withdrawal of a terminal is made to the terminal corresponding to the first registered terminal code of member data 12, and the terminal that has received said notification requests simultaneous multicast transmission to the simultaneous multicast transmission terminal, it is not always necessary that simultaneous multicast transmission be requested to a specific terminal. For example, a terminal that has recognized that another terminal has malfunctioned, or a terminal that will withdraw from the group, may directly request simultaneous multicast transmission to the simultaneous multicast transmission terminal.

[4.3] Third Variation

In addition, in the above-mentioned embodiment, there is no particular mentioned made of the case of a plurality of update information, to which the same discrimination number has been assigned, being simultaneous transmitted to the simultaneous multicast transmission terminal. However, in this case, the simultaneous multicast transmission terminal may be made to simultaneously transmit only the update information that has been received first among the update information assigned the same discrimination numbers (in this case, update information that is not simultaneously transmitted is discarded). In addition, the simultaneous multicast transmission terminal may be made to judge whether or not update information assigned the same discrimination number that has been transmitted later is eligible for simultaneous multicast transmission based on the contents of mandatory update validity information.

[4.4] Fourth Variation

In addition, in the above-mentioned embodiment, although consecutive integers from "0" to "the total number of terminals in the group−1" are pre-assigned for the terminal number of each terminal, it is not always necessary that they start from "0". For example, consecutive integers from n to "n+the total number of terminals in the group−1" (where n is an integer) may be assigned for the terminal number of each terminal. In this case, in the case of determining the simultaneous multicast transmission terminal, the terminal corresponding to the terminal number coinciding with the value obtained by adding n to the value determined by [Formula 1] becomes the simultaneous multicast transmission terminal.

[4.5] Fifth Variation

In addition, in the above-mentioned embodiment, although downloading is performed by a terminal that has received a download request from a newly added terminal, only a specific terminal may be made to perform downloading. For example, prescribed reference values may be established for specifications information of member data, and only the terminal that exceeds those reference values may perform downloading.

To provide a specific explanation of this, a terminal that, for example, has received a download request from a newly added terminal requests that downloading be executed to a terminal having specifications information of member data for which a certain performance value exceeds a prescribed reference value. The terminal that has received this request then executes downloading to the newly added terminal. As a result, terminals having low processing capacity can be excluded from terminals that execute downloading. Furthermore, in the case there are a plurality of terminals that exceed the prescribed reference value, it is optimum that the terminal having the highest performance value be selected as the terminal that executes downloading. In addition, an arbitrary terminal that exceeds the prescribed reference value may also be selected as the terminal that executes downloading.

What is claimed is:

1. A data sharing method in which data is shared within a group composed of a plurality of terminals interconnected via a network, comprising:

in the case an update is generated for shared data which is shared by the group;

each of the plurality of terminals uniquely determining in a simultaneous multicast transmission terminal determination step which of any one of the plurality of terminals is to be a simultaneous multicast transmission terminal that simultaneously transmits update information relating to updating to each terminal within the group according to a predetermined determination method by each of the terminals, transmitting from each terminal in a transmission step update information to the simultaneous multicast transmission terminal determined in the simultaneous multicast transmission terminal determination step, said simultaneous multicast terminal simultaneously transmitting in a simultaneous multicast transmission step update information to the plurality of terminals corresponding to member data which is memorized in advance by the simultaneous multicast transmission terminal, and updating in an updating step shared data according to the received update information in each terminal that has received the simultaneously transmitted update information, wherein said simultaneous multicast transmission terminal is uniquely determined in accordance with the update information which is received by each of the terminals in said simultaneous multicast transmission step.

2. The data sharing method according to claim 1 wherein, determining by a next simultaneous multicast transmission terminal in a next simultaneous multicast transmission terminal determination step the next simultaneous multicast transmission terminal that is to simultaneously transmit the next update information, transmitting in a starting notification transmission step a simultaneous multicast transmission starting notification which indicates that simultaneous multicast transmission has started in addition to update information to the next simultaneous multicast transmission terminal determined in the next simultaneous multicast transmission terminal determination step, and transmitting to the next simultaneous multicast transmission terminal in an ending notification transmission step a simultaneous multicast transmission ending notification which indicates that simultaneous multicast transmission has ended; and receiving by the next simultaneous multicast transmission terminal in a notification reception step update information, simultaneous multicast transmission starting notification and simultaneous multicast transmission ending notification, and simultaneously transmitting in a proxy simultaneous multicast transmission step, in the case a simultaneous multicast transmission ending notification has not yet been received when a prescribed amount of time has elapsed after receiving a simultaneous multicast transmission starting notification in the notification reception step, update information to the terminals corresponding to member data.

3. The data sharing method according to claim 2, further comprising:

receiving at the next simultaneous multicast transmission terminal in an update information reception step update information transmitted from each terminal, and simultaneously transmitting to the terminals in a proxy simultaneous multicast transmission step, in the case update information is update information that is to be transmitted to the simultaneous multicast transmission terminal, update information corresponding to the member data.

4. The data sharing method according to claim 1 further comprising:

judging at each terminal in a response judgment step whether or not there is a response from the simultaneous multicast transmission terminal that has transmitted update information, and determining in a next simultaneous multicast transmission terminal determination step the next simultaneous multicast transmission terminal that simultaneously transmits the next update information; and transmitting in the transmission step update information to the next simultaneous multicast transmission terminal determined in the next simultaneous multicast transmission terminal determination step in the case there is judged to be no response in the response judgment step.

5. The data sharing method according to claim 4 wherein, the next simultaneous multicast transmission terminal in a proxy simultaneous multicast transmission step simultaneously transmits update information to the terminal corresponding to the member data.

6. The data sharing method according to claim 1 further comprising:

judging at each terminal in a malfunction judgment step whether or not there is a malfunction in another terminal belonging to the group, and determining in a next simultaneous multicast transmission terminal determination step the next simultaneous multicast transmission terminal that is to simultaneously transmit the next update information; and transmitting in the transmission step update information, in which member data relating to a terminal corresponding to another communication terminal has been deleted from shared data, to the next simultaneous multicast transmission terminal determined in the next simultaneous multicast transmission terminal determination step in the case it has been judged that there is a malfunction in another terminal in the malfunction judgment step.

7. A data sharing method in which data is shared within a group composed of a plurality of terminals interconnected via network, comprising in the case an update is generated for shared data that contains basic data shared within the group and member data relating to each terminal within the group, determining in a simultaneous multicast transmission terminal determination step which of any one of the plurality of terminals is to be a simultaneous multicast transmission terminal that is to simultaneously transmit update information relating to updating to each terminal within the group according to a predetermined determination method, each terminal transmitting to a transmission step update information to the simultaneous multicast transmission terminal determined in the simultaneous multicast transmission terminal determination step, the simultaneous multicast transmission terminal simultaneously transmitting in a simultaneous multicast transmission step update information to a terminal corresponding to the member data, and updating in an updating step shared data according to the received update information in each terminal that has received the simultaneously transmitted update information, wherein, executing of each terminal a discrimination number storage step in which a discrimination number corresponding to update information is stored corresponding to shared data, the transmission step further comprises transmitting the discrimination number stored in the discrimination number storage step in addition to update information, and the simultaneous multicast transmission step further comprises simultaneously transmitting a discrimination number that is larger than the received discrimination number in the form of a new discrimination number in addition to update information.

8. The data sharing method according to claim 7 wherein, judging at the simultaneous multicast transmission terminal in a discrimination number judgment step the size of the discrimination number by comparing the received discrimination number and the discrimination number stored in the discrimination number storage step, and simultaneously transmitting in the simultaneous multicast transmission step the discrimination number in the case the received discrimination number has been judged in the discrimination number judgment step to be equal to or greater than the discrimination number stored in the discrimination number storage step.

9. A The data sharing method according to claim 8 further comprising:

each terminal storing in a mandatory simultaneous multicast transmission validity information storage step mandatory simultaneous multicast transmission validity information that indicates whether or not update information is to be forcibly simultaneously transmitted, and wherein the transmission step further comprises transmitting mandatory simultaneous multicast transmission validity information in addition to update information and the discrimination number.

10. The data sharing method according to claim 9 wherein, the simultaneous multicast transmission step simultaneously transmits update information in the case mandatory simultaneous multicast transmission validity information indicates that update information is to be forcibly simultaneously transmitted.

11. The data sharing method according to claim 7 wherein, each terminal receiving in a reception step update information and a new discrimination number, and judging in a discrimination number judgment step the size of the discrimination number by comparing the new discrimination number with the discrimination number stored in the discrimination number storage step; and the updating step further comprises updating shared data according to received update information in the case the new discrimination number has been judged in the discrimination number judgment step to be larger than the discrimination number stored in the discrimination number storage step.

12. The data sharing method according to claim 7 further comprising:

assigning a terminal number to each terminal in a terminal number assignment step in which consecutive integers from n to "the total number of terminals in the group −1" (n is an integer) are assigned as terminal numbers to each terminal so as not to be duplicated, and determining by the determination method of the simultaneous multicast transmission terminal determining step the terminal to which a terminal number is assigned that corresponds to the remainder alter dividing the discrimination number stored in the discrimination number storage step by the number of terminals corresponding to the member data.

13. The data sharing method according to claim 7 wherein, member data contains the performance value of each terminal, and the determination method of the simultaneous multicast transmission terminal determination step determines the simultaneous multicast transmission terminal based on the performance value.

14. The data sharing method according to claim 13 further comprising:

in a terminal number assignment step assigning as terminal numbers consecutive integers from n to "n+the number of terminals within the group that exceed a prescribed reference value−1" (n is an integer) only to those terminals for which the performance value contained in the member data exceeds the prescribed reference value so as not to be duplicated, and wherein the determination method of the simultaneous multicast transmission terminal determination step determines as the simultaneous multicast transmission terminal the terminal to which a terminal number is assigned that corresponds to the remainder after dividing the discrimination number stored in the discrimination number storage step by the number of terminals corresponding to the member data that exceed the reference value.

15. A data sharing method in which data is shared within a group composed of a plurality of terminals interconnected via a network, comprising, in the case an update is generated for shared data that contains basic data shared within the group and member data relating to each terminal within the group, determining in a simultaneous multicast transmission terminal determination step which any one of the plurality of terminals is to be one simultaneous multicast transmission terminal that simultaneously transmits update information relating to updating to each terminal within the group according to a predetermined determination method by each of the terminals, each terminal transmitting in a transmission step terminal update information to the simultaneous multicast transmission terminal determined in the simultaneous multicast transmission terminal determination step, the simultaneous multicast transmission terminal simultaneously transmitting to the terminals in a simultaneous multicast transmission step update information which is memorized in advance for the plurality of terminals, and updating in an updating step shared data according to the received update information in each terminal that has received the simultaneously transmitted update information, at a terminal newly added to the group requesting in a download request step downloading of the shared data from any terminal belonging to the group, at a terminal newly added to the group receiving in a shared data reception step shared data from the terminal to which downloading was requested in the download request step, at a terminal newly added to the group receiving in an update information reception step update information simultaneously transmitted within the group from the terminal to which downloading was requested, and updating in an update information updating step shared data according to received update information following completion of downloading; and the terminal to which downloading has been requested in a shared data transmission step transmitting shared data to the newly added terminal, and in an update information relay step transmitting update information received by simultaneous multicast transmission terminal to the newly added terminal.

16. The data sharing method according to claim 15 wherein, the member data contains the performance values of each terminal; and a terminal to which downloading has been requested in a request notification step makes a request to execute downloading to a terminal in which the performance value exceeds a predetermined reference value, and the terminal requested to execute downloading executes downloading to a newly added terminal.

17. The data sharing method according to claim 15 further comprising:

transmitting in the update information relay step update information to a newly added terminal that was generated during the time from update data generated immediately after the start of downloading to a newly added terminal to the generation of update data relating to member data in which the newly added terminal was added.

18. A terminal belonging to a group composed of a plurality of terminals interconnected via a network, each said terminal of the group comprising:

a shared data storage means that stores shared data which is shared by the group, a simultaneous multicast transmission terminal determination means which, in the case an update is generated for shared data, determines any one of the plurality of terminals to be a simultaneous multicast transmission terminal that is to simultaneously transmit update information relating to updating to each terminal within the group according to a predetermined determination method, a transmission means that transmits information to the simultaneous multicast transmission terminal determined by the simultaneous multicast transmission terminal determination means;

a simultaneous multicast transmission means that simultaneously transmits update information which is memorized in advance to the plurality of terminals corresponding to member data of the group of terminals when a terminal is serving as the simultaneous multicast transmission terminal, and an updating means that updates shared data according to received update information that receives the simultaneously transmitted update information wherein said simultaneous multicast transmission terminal determination means uniquely determines said simultaneous multicast transmission terminal in accordance with the update information which is received by each of the terminals.

19. The terminal according to claim 18 wherein, the simultaneous multicast transmission terminal is provided with a next simultaneous multicast transmission terminal determination means which determines the next simultaneous multicast transmission terminal that simultaneously transmits the next update information, a starting notification transmission means that transmits a simultaneous multicast transmission starting notification which indicates that simultaneous multicast transmission has started in addition to update information to the next simultaneous multicast transmission terminal determined by the next simultaneous multicast transmission terminal determination means, and an ending notification transmission means that transmits a simultaneous multicast transmission ending notification which indicates that simultaneous multicast transmission has ended to the next simultaneous multicast transmission terminal; and the next simultaneous multicast transmission terminal is provided with a notification reception means that receives update information, a simultaneous multicast transmission starting notification and a simultaneous multicast transmission ending notification, and a proxy simultaneous multicast transmission means which, in the case a simultaneous multicast transmission ending notification has not yet been received when a prescribed amount of time has elapsed after receiving a simultaneous multicast transmission starting notification by the notification reception means, simultaneously transmits update information to the terminal corresponding to member data.

20. The terminal according to claim 19, wherein, the next simultaneous multicast transmission terminal is provided with an update information reception means that receives update information transmitted from each terminal, and a proxy simultaneous multicast transmission means which, in the case update information is update information that is to be transmitted to the simultaneous multicast transmission terminal, simultaneously transmits said update information to the terminal corresponding to member data.

21. The terminal according to claim 18 wherein, a response judgment means, which judges whether or not there is a response from the simultaneous multicast transmission terminal that has transmitted update information, and a next simultaneous multicast transmission terminal determination means, which determines the next simultaneous multicast transmission terminal that simultaneously transmits the next update information, are provided, and the transmission means transmits update information to the next simultaneous multicast transmission terminal determined by the next simultaneous multicast transmission terminal determination means in the case there is judged to be no response by the response judgment means.

22. The terminal according to claim 21 wherein, the next simultaneous multicast transmission terminal is provided with a proxy simultaneous multicast transmission means which simultaneously transmits update information to the terminal corresponding to member data.

23. The terminal according to claim 18 wherein, a malfunction judgment means, which judges whether or not there is a malfunction in another terminal belonging to the group, and a next simultaneous multicast transmission terminal determination means, which determines the next simultaneous multicast transmission terminal that simultaneously transmits the next update information, may also be provided, and the transmission means may transmit update information, in which member data relating to a terminal corresponding to another communication terminal has been deleted from shared data, to the next simultaneous multicast transmission terminal determined by the next simultaneous multicast transmission terminal determination means in the case it has been judged by the malfunction judgment means that there is a malfunction in another terminal.

24. A terminal belonging to a group composed of a plurality of terminals interconnected via a network, each said terminal of the group comprising:

a shared data storage means that stores shared data containing basic data shared within the group and member data relating to each terminal within the group, a simultaneous multicast transmission terminal determination means which, in the case an update is generated for shared data, determines any one of the plurality of terminals to be a simultaneous multicast transmission terminal that is to simultaneously transmit update information relating to updating to each terminal within the group according to a predetermined determination method, a transmission means for transmitting information to the simultaneous multicast transmission terminal determined by the simultaneous multicast transmission terminal determination means;

a simultaneous multicast transmission means for simultaneously transmitting update information to the terminal corresponding to the member data as the simultaneous multicast transmission terminal, and an updating means that updates shared data according to received update information as each terminal that receives the simultaneously transmitted update information, wherein, a discrimination number storage means is provided that stores a discrimination number corresponding to update information corresponding to shared data, the transmission means transmits the discrimination number stored by the discrimination number storage means in addition to update information, and the simultaneous multicast transmission means simultaneously transmits a discrimination number that is larger than the received discrimination number in the form of a new umber in addition to update information.

25. The terminal according to claim 24 wherein, the simultaneous multicast transmission terminal is provided with a discrimination number judgment means that judges the size of the discrimination number by comparing the received discrimination number and the discrimination number stored by the discrimination number storage means, and the simultaneous multicast transmission means simultaneously transmits the discrimination number in the case the received discrimination number has been judged by the discrimination number judgment means to be equal to or greater than the discrimination number stored by the discrimination number storage means.

26. The terminal according to claim 25 wherein, a mandatory simultaneous multicast transmission validity information storage means is provided that houses mandatory simultaneous multicast transmission validity information which indicates whether or not update information is to be forcibly simultaneously transmitted, and the transmission means transmits mandatory simultaneous multicast transmission validity information in addition to update information and discrimination number.

27. The terminal according to claim 26 wherein, the simultaneous multicast transmission means simultaneously transmits update information in the case mandatory simultaneous multicast transmission validity information indicates that update information is to be forcibly simultaneously transmitted.

28. The terminal according to claim 24 wherein, a reception means that receives update information and a new discrimination number, and a discrimination number judgment means that judges the size of the discrimination number by comparing the new discrimination number with the discrimination number stored by the discrimination number storage means are provided, and the updating means updates shared data according to received update information in the case the new discrimination number has been judged by the discrimination number judgment means to be larger than the discrimination number stored by the discrimination number storage means.

29. The terminal according to claim 24 wherein, a terminal number assignment means is provided that assigns consecutive integers from n to "the total number of terminals in the group−1" (n is an integer) as terminal numbers to each terminal so as not to be duplicated, and the determination method determines as the simultaneous multicast transmission terminal the terminal to which a terminal number is assigned that corresponds to the remainder after dividing the discrimination number stored in the discrimination number storage step by the number of terminals corresponding to the member data.

30. The terminal according to claim 24 wherein, the member data contains the performance value of each terminal, and the determination method may determine the simultaneous multicast transmission terminal based on the performance value.

31. A terminal according to claim 30 wherein, a terminal number assignment means is provided that assigns consecutive integers from n to "n+the number of terminals within the group that exceed a prescribed reference value−1" (n is an integer) as terminal numbers only to those terminals for which the performance value contained in member data exceeds the prescribed reference value so as not to be duplicated, and the determination method determines as the simultaneous multicast transmission terminal the terminal to which a terminal number is assigned that corresponds to the remainder after dividing the discrimination number stored by the discrimination number storage means by the number of terminals corresponding to the member data that exceed the reference value.

32. A terminal belonging to a group composed of a plurality of terminals interconnected via a network, said terminal being provided with a shared data storage means that sores shared data containing basic data shared within the group and member data relating to each terminal with the group, a simultaneous multicast transmission terminal determination means which, in the case an update is generated for shared data, determines any one of the plurality of terminals to be one simultaneous multicast transmission terminal that simultaneously transmits update information relating to updating to each terminal within the group according to a predetermined determination method, a transmission means that transmits information to the simultaneous multicast transmission terminal determined by the simultaneous multicast transmission terminal determination means;

a simultaneous multicast transmission means that simultaneously transmits update information to the terminal corresponding to the member data as the simultaneous multicast transmission terminal, and an updating means that updates shared data according to received update information as each terminal that receives the simultaneously transmitted update information, wherein, said terminal being provided with a shared data storage means that sores shared data containing basic data shared within the group and member data relating to each terminal within the group, a simultaneous multicast transmission terminal determination means which, in the case an update is generated for shared data, determines any one of the plurality of terminals to be a simultaneous multicast transmission terminal that simultaneously transmits update information relating to updating to each terminal within the group according to a predetermined determination method, a transmission means that transmits information to the simultaneous multicast transmission terminal determined by the simultaneous multicast transmission terminal determination means;

a simultaneous multicast transmission means that simultaneously transmits update information to the terminal corresponding to the member data as the simultaneous multicast transmission terminal, and an updating means that updates shared data according to received update information as each terminal that receives the simultaneously transmitted update information, in the case of being newly added to the group, a download request means, which requests downloading of shared data to any terminal belonging to the group, in the case of being newly added to the group, a shared data reception means, which receives shared data from the terminal to which downloading was requested by the download request means, in the case of being newly added to the group, an update information reception means, which receives update information simultaneously transmitted within the group from the terminal to which downloading was requested, and an update information updating means, which updates shared data according to received update information following completion of downloading, may be provided, and the terminal to which downloading has been requested is provided with a shared data transmission means, which transmits shared data to the newly added terminal, and an update information relay means, which transmits update information received by simultaneous multicast transmission to the newly added terminal.

33. The terminal according to claim 32 wherein, the member data contains the performance values of each terminal, and a terminal to which downloading has been requested is provided with a request notification means, which requests execution of downloading to a terminal in which the performance value exceeds a predetermined reference value, and the terminal requested to execute downloading executes downloading to a newly added terminal.

34. The terminal according to claim 32 wherein, the update information relay means transmits update information to a newly added terminal that was generated during the time from update data generated immediately after the start of downloading to a newly added terminal to the generation of update data relating to member data in which the newly added terminal was added.

35. A computer readable medium on which is recorded a program for sharing data within a group composed of a plurality of terminals interconnected via a network containing instructions in the form of digital data for performing in the case updating occurs for shared data which is shared by the group, the steps of:

each of the plurality of terminals uniquely determining which of any one of the plurality of terminals is to be a simultaneous multicast transmission terminal that simultaneously transmits update information relating to updating to each terminal within the group according to a predetermined determination method, and transmitting update information to said determined simultaneous multicast transmission terminal together with the simultaneous multicast transmission terminal simultaneously transmitting update information for the plurality of terminals, which is memorized in advance to the terminal corresponding to the member data, and each terminal that has received simultaneously transmitted update information updating shared data according to said received update information, wherein said simultaneous multicast transmission terminal is uniquely determined in accordance with the update information which is received by each of the terminals.

36. The medium recorded with a program according to claim 35 wherein the instructions further comprise the steps of:

the simultaneous multicast transmission terminal determining the next simultaneous multicast transmission terminal that simultaneously transmits the next update information, and together with transmitting a simultaneous multicast transmission starting notification which indicates that simultaneous multicast transmission has started in addition to update information to said determined next simultaneous multicast transmission terminal, and a simultaneous multicast transmission ending notification which indicates that simultaneous multicast transmission has ended to the next simultaneous multicast transmission terminal, the next simultaneous multicast transmission terminal receiving update information, a simultaneous multicast transmission starting notification and a simultaneous multicast transmission ending notification, and in the case a simultaneous multicast transmission ending notification has not yet been received when a prescribed amount of time has elapsed after receiving a simultaneous multicast transmission starting notification, simultaneously transmitting update information to the terminal corresponding to member data.

37. The medium recorded with a program according to claim 36 wherein the instructions further comprise the steps of:

the next simultaneous multicast transmission terminal receiving update information transmitted from each terminal, and in the case update information is update information that is to be transmitted to the simultaneous multicast transmission terminal, may simultaneously transmit update information to the terminal corresponding to member data.

38. The medium recorded with a program according to claim 35 wherein the instructions further comprise the steps of:

each terminal judging whether or not there is a response from the simultaneous multicast transmission terminal that has transmitted update information, determining the next simultaneous multicast transmission terminal that simultaneously transmits the next update information, and transmitting update information to the determined next simultaneous multicast transmission terminal in the case there is judged to be no response in said judgment.

39. The medium recorded with a program according to claim 38 wherein the instructions further comprise the steps of:

the next simultaneous multicast transmission terminal simultaneously transmitting update information to the terminal corresponding to member data.

40. The medium recorded with a program according to claim 35 wherein the instructions further comprise the steps of:

each terminal judging whether or not there is a malfunction in another terminal belonging to the group, determining the next simultaneous multicast transmission terminal that simultaneously transmits the next update information, and transmitting update information, in which member data relating to a terminal corresponding to another communication terminal has been deleted from shared data, to the determined next simultaneous multicast transmission terminal in the case it has been judged that there is a malfunction in another terminal in said judgment.

41. A computer readable medium on which is recorded a program for sharing data within a group composed of a plurality of terminals interconnected via a network and containing instructions in the form of digital data for performing in the case updating occurs for shared data containing basic data shared within the group and member data relating to each terminal within the group, the steps of:

determining which of any one of the plurality of terminals is to be a simultaneous multicast transmission terminal that simultaneously transmits update information relating to updating to each terminal within the group according to a predetermined determination method, and transmitting update information to said determined simultaneous multicast transmission terminal together with the simultaneous multicast transmission terminal simultaneously transmitting update information to the terminal corresponding to the member data, and each terminal that has received simultaneously transmitted update information updating shared data according to said received update information, each terminal storing a discrimination number corresponding to update information corresponding to shared data, and transmitting the stored discrimination number to the determined simultaneous multicast transmission terminal in addition to update information; and the simultaneous multicast transmission terminal simultaneously transmitting a discrimination number that is larger than the received discrimination number in the form of a new discrimination number in addition to update information.

42. The medium recorded with a program according to claim 41 wherein the instructions further comprise the steps of:

the simultaneous multicast transmission terminal judging the size of the discrimination number by comparing the received discrimination number and the stored discrimination number, and simultaneously transmitting the discrimination number in the case the received discrimination number has been judged in said judgment to be equal to or greater than the stored discrimination number.

43. The medium recorded with a program according to claim 42 wherein the instructions further comprise the steps of:

each terminal storing mandatory simultaneous multicast transmission validity information which indicates whether or not update information is to be forcibly simultaneously transmitted, and transmitting mandatory simultaneous multicast transmission validity information in addition to update information and discrimination number to the determined simultaneous multicast transmission terminal.

44. The medium recorded with a program according to claim 43 wherein the instructions further comprise the steps of:

the simultaneous multicast transmission terminal simultaneously transmitting update information in the case received mandatory simultaneous multicast transmission validity information indicates that update information is to be forcibly simultaneously transmitted.

45. The medium recorded with a program according to claim 41 wherein the instructions further comprise the steps of:

each terminal receiving update information and a new discrimination number, judging the size of the discrimination number by comparing the new discrimination number with the stored discrimination number, and when simultaneously transmitted update information is received, updating shared data according to received update information in the case the new discrimination number has been judged in said judgment to be larger than the stored discrimination number.

46. The medium recorded with a program according to claim 41 wherein the instructions further comprise the steps of:

each terminal assigning consecutive integers from n to "the total number of terminals in the group−1" (n is an integer) as terminal numbers to each terminal so as not to be duplicated, and the determination method determining as the simultaneous multicast transmission terminal the terminal to which a terminal number is assigned that corresponds to the remainder after dividing the stored discrimination number by the number of terminals corresponding to the member data.

47. The medium recorded with a program according to claim 41 wherein the instructions further comprise the steps of:

the member data contains the performance value of each terminal, and the determination method determines the simultaneous multicast transmission terminal based on the performance value.

48. The medium recorded with a program according to claim 47 wherein the instructions further comprise the steps of:

each terminal assigns consecutive integers from n to "n+the number of terminals within the group that exceed a prescribed reference value−1" (n is an integer) as terminal numbers only to those terminals for which the performance value contained in member data exceeds the prescribed reference value so as not to be duplicated, and the determination method determines as the simultaneous multicast transmission terminal the terminal to which a terminal number is assigned that corresponds to the remainder after dividing the stored discrimination number by the number of terminals corresponding to the member data that exceed the reference value.

49. A computer readable medium on which is recorded a program for sharing data with a group composed of a plurality of terminals interconnected via a network containing instructions in the form of digital data for performing in the case updating occurs for shared data containing basic data shared within the group and member data relating to each terminal within the group, the steps of:

determining which of any of the plurality of terminals is to be one simultaneous multicast transmission terminal that simultaneously transmits update information relating to updating to each terminal within the group according to a predetermined determination method, and together with transmitting update information to said determined simultaneous multicast transmission terminal, the simultaneous multicast transmission terminal simultaneously transmitting update information to the terminal corresponding to group member data, and each terminal that has received simultaneously transmitted update information updating shared data according to said received update information, wherein, a terminal that is newly added to the group requesting downloading of shared data to any terminal belonging to the group, a terminal newly added to the group receiving shared data from the terminal to which downloading has been requested, a terminal newly added to the group receiving update information simultaneously transmitted within the group from the terminal to which downloading was requested, and after completion of downloading, together with updating the shared data according to the received update information, the terminal to which downloading was requested transmitting shared data to the newly added terminal, and transmitting update information received by simultaneous multicast transmission to the newly added terminal.

50. The medium recorded with a program according to claim 49 wherein the member data contains the performance values of each terminal and the instructions further comprise the steps of:

a terminal to which downloading has been requested requesting execution of downloading to a terminal in which the performance value exceeds a predetermined reference value, and the terminal requested to execute downloading executing downloading to newly added terminal.

51. The medium recorded with a program according to claim 49 wherein, when update information received by simultaneous multicast transmission is transmitted to a terminal that has been newly added, the instructions further comprise the steps of:

transmitting update information to the newly added terminal that was generated during the time from update data generated immediately after the start of downloading to a newly added terminal to the generation of update data relating to member data in which the newly added terminal was added.

* * * * *